US012293738B2

(12) United States Patent
Tian

(10) Patent No.: US 12,293,738 B2
(45) Date of Patent: May 6, 2025

(54) REFRESH RATE SWITCHING METHOD AND ELECTRONIC DEVICE

(71) Applicant: HONOR DEVICE CO., LTD., Shenzhen (CN)

(72) Inventor: Qifei Tian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/659,433

(22) Filed: May 9, 2024

(65) Prior Publication Data
US 2024/0296813 A1 Sep. 5, 2024

Related U.S. Application Data

(63) Continuation of application No. PCT/CN2023/131518, filed on Nov. 14, 2023.

(30) Foreign Application Priority Data

Jan. 5, 2023 (CN) .......................... 202310014034.5

(51) Int. Cl.
G09G 3/20 (2006.01)
G09G 5/00 (2006.01)

(52) U.S. Cl.
CPC ........ *G09G 5/003* (2013.01); *G09G 2330/023* (2013.01); *G09G 2340/0435* (2013.01)

(58) Field of Classification Search
CPC ............ G09G 5/00; G09G 5/003; G09G 5/18; G09G 5/39; G09G 5/393; G09G 5/395;
(Continued)

(56) References Cited

U.S. PATENT DOCUMENTS 11,817,050 B2   11/2023   Lee et al.
11,935,489 B2   3/2024    Wai et al.
(Continued)

FOREIGN PATENT DOCUMENTS

CN   112511716 A   3/2021
CN   112667340 A   4/2021
(Continued)

*Primary Examiner* — Chanh D Nguyen
*Assistant Examiner* — Nguyen H Truong
(74) *Attorney, Agent, or Firm* — WOMBLE BOND DICKINSON (US) LLP

(57) ABSTRACT

This application discloses a refresh rate switching method and an electronic device. The method includes: When it is determined that a refresh rate of the display screen is to be switched, a second refresh rate is determined; when the second refresh rate is lower than a first refresh rate, a SOC sends a first switching instruction to a display screen IC; the display screen IC switches the refresh rate of the display screen from the first refresh rate to the second refresh rate; when the SOC determines that the switching of the refresh rate of the display screen is completed, the SOC switches transmission duration of image data corresponding to a first application from first transmission duration to second transmission duration corresponding to the second refresh rate; and the SOC transmits the image data corresponding to the first application to the display screen IC based on the second transmission duration.

20 Claims, 13 Drawing Sheets

(58) Field of Classification Search
CPC ............ G09G 5/397; G09G 3/20; G09G 3/32;
G09G 3/36; G09G 3/3208; G09G 3/3225;
G09G 3/3291; G09G 2330/023; G09G
2340/0435; G06T 1/00; G06T 1/20; G06T
1/60; G06T 9/00; G06F 3/0484; G06F
9/451; H04N 5/04; H04N 7/01; H04N
19/89; H04N 19/166
See application file for complete search history.

(56) References Cited

U.S. PATENT DOCUMENTS

| | | | |
|---|---|---|---|
| 2016/0078846 A1* | 3/2016 | Liu | G09G 5/18 |
| | | | 345/212 |
| 2016/0275905 A1 | 9/2016 | Sacchetto et al. | |
| 2016/0358303 A1 | 12/2016 | Juliano | |
| 2017/0193971 A1 | 7/2017 | Bi et al. | |
| 2020/0202802 A1* | 6/2020 | Zhu | G09G 3/3611 |
| 2020/0320958 A1 | 10/2020 | Sinha et al. | |
| 2022/0351670 A1* | 11/2022 | Li | G09G 3/2081 |
| 2022/0351679 A1 | 11/2022 | Yang et al. | |
| 2022/0383805 A1* | 12/2022 | Lee | G09G 3/3233 |
| 2023/0290298 A1 | 9/2023 | Gao et al. | |
| 2023/0419892 A1* | 12/2023 | Nam | G09G 3/20 |
| 2024/0185775 A1 | 6/2024 | Zhang et al. | |

FOREIGN PATENT DOCUMENTS

| | | |
|---|---|---|
| CN | 113763904 A | 12/2021 |
| CN | 114205485 A | 3/2022 |
| CN | 114420038 A | 4/2022 |
| CN | 114613306 A | 6/2022 |
| CN | 114632329 A | 6/2022 |
| CN | 114648951 A | 6/2022 |
| CN | 115100993 A | 9/2022 |
| CN | 116092452 A | 5/2023 |
| WO | 2021143458 A1 | 7/2021 |
| WO | 2021153955 A1 | 8/2021 |

* cited by examiner

REFRESH RATE SWITCHING METHOD AND ELECTRONIC DEVICE

CROSS-REFERENCE TO RELATED APPLICATIONS

This application is a continuation of International Application No. PCT/CN2023/131518, filed on Nov. 14, 2023, which claims priority to Chinese Patent Application No. 202310014034.5, filed on Jan. 5, 2023. The disclosures of the aforementioned applications are hereby incorporated by reference in their entireties.

TECHNICAL FIELD

This application relates to the field of electronic devices, and in particular, to a refresh rate switching method and an electronic device.

BACKGROUND

With continuous development of display screen technologies for electronic devices such as a mobile phone, display screens of increasingly more electronic devices can support a plurality of refresh rates. The refresh rate of the display screen of the electronic device is adjusted based on different display frame rates of applications of the electronic device. For example, when some applications on the electronic device run, a display frame rate of the application is increased. When the display frame rate of the application is increased, the refresh rate of the display screen of the electronic device is also increased accordingly, so that smoothness of a picture displayed on the display screen of the electronic device can be improved.

However, when the refresh rate of the display screen of the electronic device is adjusted, an adjustment time of hardware of the electronic device is inconsistent with an adjustment time of software of the electronic device. In this case, in a process of adjusting the refresh rate of the display screen of the electronic device, a problem such as freezing may occur on the picture displayed on the display screen of the electronic device.

SUMMARY

Embodiments of this application provide a refresh rate switching method and an electronic device, to avoid a problem of freezing occurring on a picture displayed on a display screen of the electronic device in a process of switching a refresh rate of the display screen of the electronic device.

To achieve the foregoing objective, the following technical solutions are used in the embodiments of this application.

According to a first aspect, an embodiment of this application provides a refresh rate switching method, applied to an electronic device. The refresh rate switching method may include: The electronic device runs a first application; a display screen integrated circuit IC of the electronic device displays image data corresponding to the first application on a display screen based on a first refresh rate, and a system on chip SOC of the electronic device transmits the image data corresponding to the first application to the display screen IC based on first transmission duration corresponding to the first refresh rate; when the electronic device determines that a refresh rate of the display screen is to be switched, the electronic device determines a second refresh rate; when the second refresh rate is lower than the first refresh rate, the SOC of the electronic device sends a first switching instruction to the display screen IC; the display screen IC switches the refresh rate of the display screen from the first refresh rate to the second refresh rate based on the first switching instruction; when the SOC of the electronic device determines that the switching of the refresh rate of the display screen is completed, the SOC of the electronic device switches transmission duration of the image data corresponding to the first application from the first transmission duration to second transmission duration corresponding to the second refresh rate; and the SOC of the electronic device transmits the image data corresponding to the first application to the display screen IC based on the second transmission duration, and the display screen IC displays the image data corresponding to the first application on the display screen based on the second refresh rate.

According to the method in the first aspect, when the refresh rate of the display screen of the electronic device is switched from a high refresh rate (the second refresh rate) to a low refresh rate (the first refresh rate), the SOC of the electronic device first sends the switching instruction to the display screen IC, and the display screen IC switches the refresh rate of the display screen from the high refresh rate to the low refresh rate. After the SOC of the electronic device determines that refresh rate switching is completed, the SOC of the electronic device switches a time for transmitting the image data from duration corresponding to the high refresh rate (the first transmission duration) to duration corresponding to the low refresh rate (the second transmission duration). When the SOC of the electronic device delivers a rate switching instruction, the SOC of the electronic device does not switch duration in which the SOC of the electronic device transmits the image data to the display screen IC of the electronic device. This can avoid a problem of trampling TE when the refresh rate of the display screen of the electronic device is switched from the high refresh rate to the low refresh rate, and can avoid a problem such as freezing occurring on a picture displayed on a screen of the electronic device in a process of adjusting the refresh rate of the display screen of the electronic device.

With reference to the first aspect, in another possible implementation, that the SOC of the electronic device determines that the switching of the refresh rate of the display screen is completed may include: When a rising edge of a third Vsync signal obtained after the SOC of the electronic device sends a vertical synchronization Vsync signal of the first switching instruction arrives, the SOC of the electronic device determines that the switching of the refresh rate of the display screen is completed.

Based on this possible implementation, when the rising edge of the third Vsync signal obtained after the SOC of the electronic device sends the vertical synchronization Vsync signal of the first switching instruction arrives, the SOC of the electronic device may determine that the switching of the refresh rate of the display screen is completed, and the SOC of the electronic device may switch the transmission duration of the image data corresponding to the first application from the first transmission duration to the second transmission duration corresponding to the second refresh rate.

With reference to the first aspect, in another possible implementation, that the SOC of the electronic device sends a first switching instruction to the display screen IC may include: The SOC of the electronic device sends the first switching instruction to the display screen IC by using a delay switching transmission time interface; and that the SOC of the electronic device switches transmission duration of the image data corresponding to the first application from the first transmission duration to second transmission duration corresponding to the second refresh rate may include: The SOC of the electronic device switches the transmission duration of the image data corresponding to the first application from the first transmission duration to the second transmission duration by using the delay switching transmission time interface.

Based on this possible implementation, the SOC of the electronic device may first send a switching instruction for refresh rate switching to the display screen IC by using the delay switching transmission time interface. When the SOC of the electronic device determines that the switching of the refresh rate of the display screen is completed, the SOC of the electronic device may switch the transmission duration of the image data corresponding to the first application from the first transmission duration to the second transmission duration by using the delay switching transmission time interface.

With reference to the first aspect, in another possible implementation, when the second refresh rate is higher than the first refresh rate, the SOC of the electronic device sends a second switching instruction to the display screen IC of the electronic device, disables a low power mode ulps, and switches the transmission duration of the image data corresponding to the first application from the first transmission duration to the second transmission duration corresponding to the second refresh rate; the display screen IC of the electronic device switches the refresh rate of the display screen from the first refresh rate to the second refresh rate based on the second switching instruction; when the SOC of the electronic device determines that the switching of the refresh rate of the display screen is completed, the SOC of the electronic device enables the low power mode ulps; and the SOC of the electronic device transmits the image data corresponding to the first application to the display screen IC based on the second transmission duration, and the display screen IC displays the image data corresponding to the first application on the display screen based on the second refresh rate.

Based on this possible implementation, when the refresh rate of the display screen of the electronic device is switched from a low refresh rate (the first refresh rate) to a high refresh rate (the second refresh rate), while the SOC of the electronic device sends the switching instruction to the display screen IC, the SOC of the electronic device may disable the low power mode ulps, and switch a time for transmitting the image data from duration corresponding to the low refresh rate (the first transmission duration) to a time corresponding to the high refresh rate (the second transmission duration). When the SOC of the electronic device switches the time for transmitting the image data from a time corresponding to the low refresh rate to a time corresponding to the high refresh rate, the SOC of the electronic device exits the low power mode without re-enabling the low power mode. After the SOC of the electronic device determines that the switching of the refresh rate is completed, the SOC of the electronic device enables the low power mode. When the SOC of the electronic device adjusts the time for transmitting the image data from the time corresponding to the low refresh rate to the time corresponding to the high refresh rate, the SOC of the electronic device exits the low power mode without re-enabling the low power mode. This can shorten duration of switching the time for transmitting the image data. Therefore, it can be avoided that the duration of adjusting the time for transmitting the image data is excessively long, which causes a phenomenon such as blurring occurring on the screen of the electronic device because a next frame of image data starts to be transmitted before transmission of one frame of image data is completed.

With reference to the first aspect, in another possible implementation, that the SOC of the electronic device determines that the switching of the refresh rate of the display screen is completed may include: When a rising edge of a third Vsync signal obtained after the SOC of the electronic device sends a vertical synchronization Vsync signal of the second switching instruction arrives, the SOC of the electronic device determines that the switching of the refresh rate of the display screen is completed.

Based on this possible implementation, when the rising edge of the third Vsync signal obtained after the SOC of the electronic device sends the vertical synchronization Vsync signal of the first switching instruction arrives, the SOC of the electronic device may determine that the switching of the refresh rate of the display screen is completed, and the SOC of the electronic device may switch the transmission duration of the image data corresponding to the first application from the first transmission duration to the second transmission duration corresponding to the second refresh rate.

With reference to the first aspect, in another possible implementation, that the electronic device determines that a refresh rate of the display screen is to be switched may include: When a display frame rate of the first application is switched, the electronic device determines that the refresh rate of the display screen is to be switched.

Based on this possible implementation, the electronic device may determine, by determining whether the display frame rate of the first application is switched, that the refresh rate of the display screen is to be switched.

With reference to the first aspect, in another possible implementation, that the electronic device determines a second refresh rate may include: When the display frame rate of the first application is switched to a first display frame rate, the electronic device determines the second refresh rate based on the first display frame rate.

Based on this possible implementation, the electronic device may determine, by determining whether the display frame rate of the first application is switched, that the refresh rate of the display screen is to be switched. In addition, when determining that the refresh rate of the display screen is to be switched, the electronic device may determine a switched-to refresh rate based on a switched-to display frame rate of the first application.

With reference to the first aspect, in another possible implementation, the first application may include a game application, a video application, or a navigation application.

Based on this possible implementation, the electronic device may determine, when a display frame rate of an application including the game application, the video application, the navigation application, or the like is switched, that the refresh rate of the display screen is to be switched. In addition, when determining that the refresh rate of the display screen is to be switched, the electronic device may determine a switched-to refresh rate based on a switched-to display frame rate.

According to a second aspect, an embodiment of this application provides a refresh rate switching apparatus, and the refresh rate switching apparatus may be applied to an electronic device to implement the method according to the first aspect. A function of the refresh rate switching apparatus may be implemented by using hardware, or may be implemented by executing corresponding software by hardware. The hardware or the software includes one or more modules corresponding to the foregoing function, for example, a running module, a display module, a transmission module, a determining module, a sending module, and a switching module.

The running module may be configured to run a first application.

The display module may be configured to display image data corresponding to the first application on a display screen based on a first refresh rate.

The transmission module may be configured to transmit the image data corresponding to the first application to a display screen IC based on first transmission duration corresponding to the first refresh rate.

The determining module may be configured to determine a second refresh rate when the electronic device determines that a refresh rate of the display screen is to be switched.

The sending module may be configured to send a first switching instruction to the display screen IC when the second refresh rate is lower than the first refresh rate.

The switching module may be configured to switch the refresh rate of the display screen from the first refresh rate to the second refresh rate based on the first switching instruction.

The switching module may be further configured to: when a SOC of the electronic device determines that the switching of the refresh rate of the display screen is completed, switch transmission duration of the image data corresponding to the first application from the first transmission duration to second transmission duration corresponding to the second refresh rate.

The transmission module may be further configured to transmit the image data corresponding to the first application to the display screen IC based on the second transmission duration.

The display module may be configured to display the image data corresponding to the first application on the display screen based on the second refresh rate.

With reference to the second aspect, in another possible implementation, the determining module may be configured to: when a rising edge of a third Vsync signal obtained after the SOC of the electronic device sends a vertical synchronization Vsync signal of the first switching instruction arrives, determine that the switching of the refresh rate of the display screen is completed.

With reference to the second aspect, in another possible implementation, the sending module may be specifically configured to send the first switching instruction to the display screen IC by using a delay switching transmission time interface.

The switching module may be specifically configured to switch the transmission duration of the image data corresponding to the first application from the first transmission duration to the second transmission duration by using the delay switching transmission time interface.

With reference to the second aspect, in another possible implementation, the sending module may be further configured to send a second switching instruction to the display screen IC of the electronic device when the second refresh rate is higher than the first refresh rate.

The refresh rate switching apparatus may further include a disabling module. The disabling module is configured to disable a low power mode ulps.

The switching module may be further configured to switch the transmission duration of the image data corresponding to the first application from the first transmission duration to the second transmission duration corresponding to the second refresh rate.

The switching module may be further configured to switch the refresh rate of the display screen from the first refresh rate to the second refresh rate based on the second switching instruction.

The refresh rate switching apparatus may further include an enabling module. The enabling module may be configured to enable the low power mode ulps when the SOC of the electronic device determines that the switching of the refresh rate of the display screen is completed.

The transmission module may be further configured to transmit the image data corresponding to the first application to the display screen IC based on the second transmission duration.

The display module may be further configured to display the image data corresponding to the first application on the display screen based on the second refresh rate.

With reference to the second aspect, in another possible implementation, the determining module may be configured to: when a rising edge of a third Vsync signal obtained after the SOC of the electronic device sends a vertical synchronization Vsync signal of the second switching instruction arrives, determine that the switching of the refresh rate of the display screen is completed.

With reference to the second aspect, in another possible implementation, the determining module may be configured to: when a display frame rate of the first application is switched, determine that the refresh rate of the display screen is to be switched.

With reference to the second aspect, in another possible implementation, the determining module may be specifically configured to: when the display frame rate of the first application is switched to a first display frame rate, determine the second refresh rate based on the first display frame rate.

With reference to the second aspect, in another possible implementation, the first application may include a game application, a video application, or a navigation application.

According to a third aspect, a refresh rate switching device is provided. The refresh rate switching device has a function of implementing the method according to the first aspect. The function may be implemented by using hardware, or may be implemented by executing corresponding software by hardware. The hardware or the software includes one or more modules corresponding to the foregoing function.

According to a fourth aspect, a refresh rate switching device is provided, including a processor and a memory. The memory is configured to store computer-executable instructions. When the refresh rate switching device runs, the processor executes the computer-executable instructions stored in the memory, to enable the refresh rate switching device to perform the refresh rate switching method according to any one of the possible implementations of the first aspect.

According to a fifth aspect, a refresh rate switching device is provided, including a processor. The processor is configured to: be coupled to a memory, and after reading instructions in the memory, perform the refresh rate switching method according to any one of the possible implementations of the first aspect based on the instructions.

According to a sixth aspect, an embodiment of this application provides a computer-readable storage medium, and the computer-readable storage medium stores computer program instructions. When the computer program instructions are executed by an electronic device, the electronic device is enabled to implement the refresh rate switching method according to any one of the first aspect or the possible implementations of the first aspect.

According to a seventh aspect, an embodiment of this application provides a computer program product, including computer-readable code. When the computer-readable code is run in an electronic device, the electronic device is enabled to implement the refresh rate switching method according to any one of the first aspect or the possible implementations of the first aspect.

According to an eighth aspect, an apparatus (for example, the apparatus may be a chip system) is provided. The apparatus includes a processor, configured to support an electronic device in implementing a function in the first aspect. In a possible design, the apparatus further includes a memory. The memory is configured to store program instructions and data that are necessary for the electronic device. When the apparatus is a chip system, the apparatus may include a chip, or may include a chip and another discrete device.

It should be understood that, for beneficial effects of the second aspect to the eighth aspect, refer to related descriptions in the first aspect. Details are not described herein again.

DESCRIPTION OF EMBODIMENTS

Figure 1:
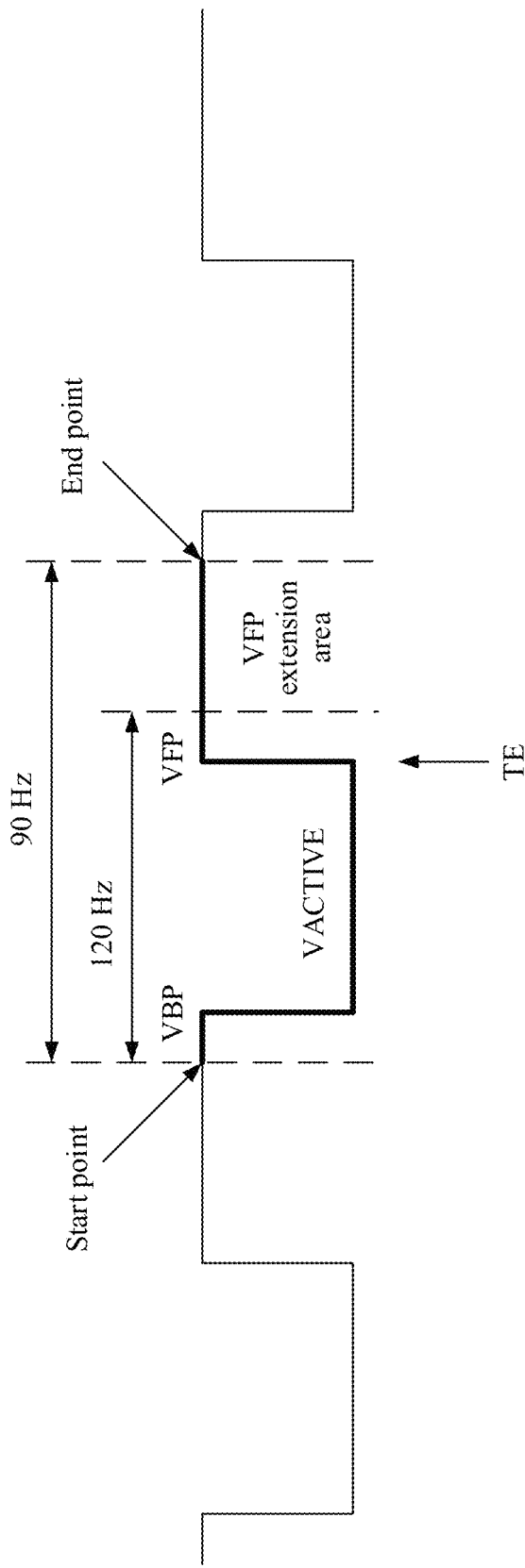
FIG. 1 is a first schematic diagram of a waveform of a Vsync signal according to an embodiment of this application.

The following clearly and completely describes the technical solutions in embodiments of this application with reference to the accompanying drawings in embodiments of this application. Clearly, the described embodiments are merely some rather than all of embodiments of this application. Based on embodiments of this application, all other embodiments obtained by a person of ordinary skill in the art without creative efforts fall within the protection scope of this application.

Terms "first" and "second" are merely used for description purposes, and shall not be understood as indicating or implying relative importance or implicitly indicating a quantity of indicated technical features. Therefore, features defined with "first" and "second" may explicitly or implicitly include one or more of the features. In the description of this application, unless otherwise stated, "a plurality of" means two or more.

To clearly describe the technical solutions in the embodiments of this application, the following briefly describes some terms and technologies related to the embodiments of this application.

A screen refresh rate, namely, a refresh rate of a display screen of an electronic device, may also be referred to as a frame rate of the display screen. The screen refresh rate is a hardware performance parameter of the display screen of the electronic device, namely, a quantity of times that the display screen of the electronic device can refresh a displayed image per second. The screen refresh rate usually may be represented in a physical unit Hz. A panel of the display screen is full of physical pixels. For example, a resolution of the display screen is 1080*1920 progressive scanning (Progressive scanning, P), and in this case, the display screen has 1080*1920 pixels, each line of the display screen includes 1080 pixels, and each column of the display screen includes 1920 pixels. That the display screen completes displaying 1080 pixels in one line is referred to as line scanning. That the display screen displays pixels in 1920 lines is referred to as field scanning. A physical signal obtained when the display screen starts to scan a line is referred to as a horizontal synchronization (horizontal synchronization pulse, Hsync) signal. A physical signal obtained when the display screen starts to scan a field is referred to as a vertical synchronization (Vertical synchronization, Vsync) signal. After the display screen completes scanning one field, the display screen may display one frame of image data, that is, the display screen may display one frame of image data in a period of one Vsync signal.

A specific quantity of fields that can be refreshed by the display screen per second indicates a specific quantity of frames of image data that can be displayed by the display screen per second, and a specific quantity of Vsync signals that need to be generated by the electronic device per second. In other words, the quantity of Vsync signals generated by the electronic device per second is referred to as the refresh rate of the display screen. For example, a refresh rate of the display screen is 60 hertz (hertz, Hz), that is, a screen refresh rate is 60 Hz. In this case, the display screen can refresh and display pictures for 60 times per second. To be specific, the display screen may display 60 frames of image data per second, and the electronic device needs to generate 60 Vsync signals per second. A period of a Vsync signal generated by the electronic device is a field synchronization period (Vsync period). When the refresh rate of the display screen is 60 Hz, the field synchronization period is 16.6 milliseconds.

The Vsync signal may be generated by a hardware composer (Hardware Composer, HWC) of the electronic device. After the HWC generates a Vsync signal, an application may send, to the display screen within a period of the Vsync signal, an image that needs to be displayed, and the display screen may display the image data. In other words, in a period corresponding to one Vsync signal, the application may draw one frame of image data, and send the frame of image data to the display screen, and the display screen may display the frame of image data.

A display frame rate of an application refers to a speed at which the application draws a picture (namely, image data). The display frame rate of the application usually may be represented by using a quantity of transmitted image frames per second (frame per second, fps). In other words, the display frame rate of the application refers to a frequency at which the application outputs image data to the display screen.

A tearing effect (tearing effect, TE) signal is a signal generated by a chip of the electronic device, and is used to prevent a tearing problem when a picture is refreshed in an image display process. When the display screen of the electronic device is ready to refresh a next frame of image data, the chip of the electronic device generates a TE signal on a rising edge in the foregoing field synchronization period. Correspondingly, after the application monitors and detects the TE signal, the application may send the next frame of image data to the chip of the electronic device, so that the display screen of the electronic device may display the next frame of image data.

With continuous development of display screen technologies for electronic devices such as a mobile phone, display screens of increasingly more electronic devices can support a plurality of refresh rates, for example, the display screen of the electronic device can support 60 Hz, 90 Hz, and 120 Hz. That is, the display screen of the electronic device can support a plurality of levels of screen refresh rates.

The refresh rate of the display screen of the electronic device is adjusted based on different display frame rates of applications of the electronic device. For example, when some applications on the electronic device run, a display frame rate of the application is increased. For example, when the some applications on the electronic device run, a motion effect frequency increase is used. Therefore, when the application runs, a display frame rate of the application needs to be increased. Alternatively, some applications of the electronic device run at display frame rates different from an actual display frame rate of a home screen of the electronic device. Therefore, when the application runs, the display frame rate of the application needs to be increased or the display frame rate of the application needs to be switched.

When the display frame rate of the application is increased, the refresh rate of the display screen of the electronic device is also increased accordingly, so that smoothness of a picture displayed on the display screen of the electronic device can be improved.

However, when the refresh rate of the display screen of the electronic device is adjusted, a time at which hardware of the electronic device adjusts the refresh rate is inconsistent with a time at which software of the electronic device adjusts the refresh rate. The time at which the hardware of the electronic device adjusts the refresh rate is a time at which a display screen integrated circuit (integrated circuit, IC) of the electronic device adjusts the refresh rate of the display screen, and may also be referred to as a time at which the hardware of the electronic device performs a frame switching action. The time at which the software of the electronic device adjusts the refresh rate is a time at which software in a system on chip (system on chip, SOC) of the electronic device adjusts the refresh rate of the display screen, and may also be referred to as a time at which the software of the electronic device performs a frame switching action.

An adjustment time of the hardware of the electronic device is inconsistent with an adjustment time of the software of the electronic device. This is caused by different determining logic of the hardware of the electronic device and the software of the electronic device for a frame in the field synchronization period.

Figure 2:
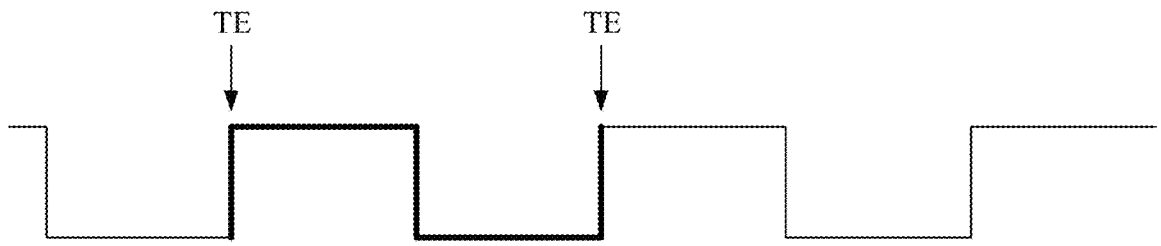
FIG. 2 is a second schematic diagram of a waveform of a Vsync signal according to an embodiment of this application.

The following separately describes determining logic of the hardware of the electronic device and the software of the electronic device for a frame in a field synchronization period with reference to FIG. 1 and FIG. 2.

A waveform of a Vsync signal in the field synchronization period is shown in FIG. 1. The determining logic of the hardware (namely, the display screen IC, or which may be briefly referred to as a panel) of the electronic device for a frame in the field synchronization period starts from a short period of time before a falling edge in the waveform. That is, a start point in FIG. 1 is a start time of the frame in the field synchronization period in the determining logic of the hardware of the electronic device. This small segment of high level after the start point is referred to as a vertical back porch (Vertical Back Porch, VBP). After the vertical back porch VBP, the waveform of the Vsync signal goes through the falling edge, and there is a segment of low level (VACTIVE) after the falling edge. A rising edge after the low level is referred to as a tearing effect TE signal by the software of the electronic device. A short period of time of high level immediately after the tearing effect TE signal is referred to as a vertical front porch (vertical front porch, VFP). A compensation time (namely, a VFP extension area) is added after the vertical front porch VFP to form a complete frame in the field synchronization period in the determining logic of the hardware of the electronic device. A length of the VFP extension area varies. For different refresh rates, for example, lengths of the VFP extension area are different when a refresh rate is 120 Hz and when a refresh rate is 90 Hz. At an end of the compensation time, namely, an end point, the end point is an end time of the frame in the field synchronization period in the determining logic of the hardware of the electronic device. In other words, as shown in FIG. 1, the complete frame in the field synchronization period in the determining logic of the hardware of the electronic device starts from the start point in FIG. 1, goes through the vertical back porch VBP, the low level, the tearing effect TE signal, the vertical front porch VFP, and the VFP extension area, and then arrives at the end point.

However, as shown in FIG. 2, a frame in a field synchronization period in the determining logic of the software (namely, software in a system on chip SOC) of the electronic device is from a rising edge in a waveform of a Vsync signal to a next rising edge. To be specific, a complete frame in the field synchronization period in the determining logic of the software of the electronic device starts with a tearing effect TE signal in the waveform of the Vsync signal and ends with a next tearing effect TE signal. The complete frame in the field synchronization period in the determining logic of the software of the electronic device is between two rising edges.

It may be learned from FIG. 1 and FIG. 2 that the complete frame in the field synchronization period in the determining logic of the software of the electronic device is obviously different from the complete frame in the field synchronization period in the determining logic of the hardware of the electronic device. In this case, when a refresh rate of the display screen of the electronic device is adjusted, an adjustment time of the hardware of the electronic device is inconsistent with an adjustment time of the software of the electronic device. To be specific, when the hardware of the electronic device performs refresh rate adjustment (that is, the Panel of the electronic device actually performs a frame switching action), the software of the electronic device does not perform refresh rate adjustment (namely, refresh rate switching). A time at which the software of the electronic device performs the refresh rate adjustment (namely, a time at which the software of the electronic device collects the frame switching action) is later than a time at which the hardware of the electronic device performs the refresh rate adjustment.

That an adjustment time of the hardware of the electronic device is inconsistent with an adjustment time of the software of the electronic device when a refresh rate of the display screen of the electronic device is adjusted is described below with reference to FIG. 3 and FIG. 4.

For the hardware of the electronic device, when the refresh rate of the display screen of the electronic device is adjusted, the software of the electronic device delivers a frame switching instruction (namely, an instruction for adjusting the refresh rate of the display screen) to the hardware of the electronic device in a waveform of one Vsync signal. When a vertical back porch VBP in a waveform of a next Vsync signal arrives, the hardware of the electronic device adjusts the refresh rate of the display screen.

Figure 3:
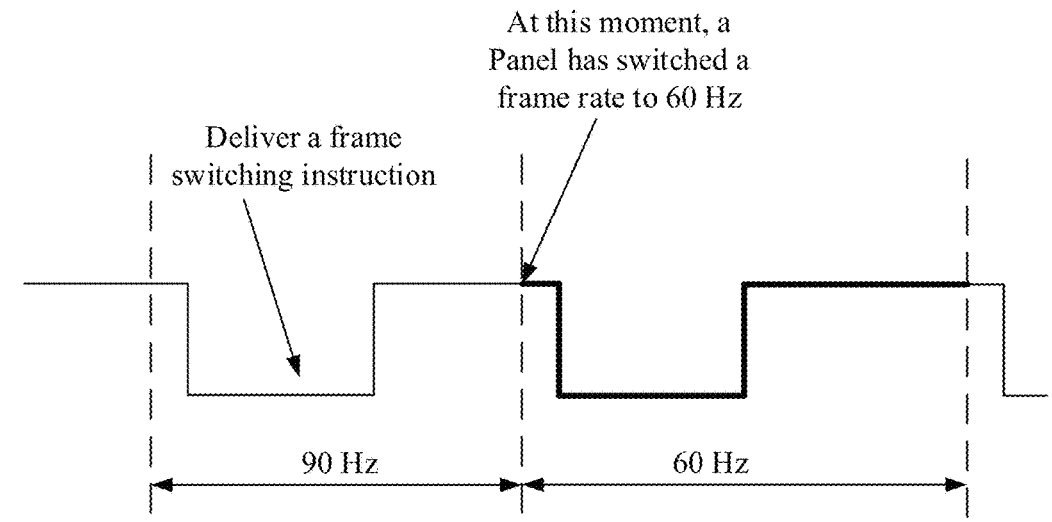
FIG. 3 is a first schematic diagram of a waveform of a Vsync signal during refresh rate switching according to an embodiment of this application.

For example, with reference to FIG. 3, by using an example in which the electronic device adjusts the refresh rate of the display screen from 90 Hz to 60 Hz, the software of the electronic device delivers a frame switching instruction to the hardware of the electronic device at a low level phase in a waveform of one Vsync signal. When a vertical back porch VBP in a waveform of a next Vsync signal arrives, the hardware of the electronic device adjusts the refresh rate of the display screen to 60 Hz. In other words, from a perspective of the hardware of the electronic device, a new frame rate (that is, a new refresh rate) takes effect immediately in this frame if the frame switching instruction is delivered before a vertical back porch VBP phase in a waveform of one frame of Vsync signal in the determining logic of the hardware of the electronic device. The new refresh rate takes effect only in a next frame in the determining logic of the hardware of the electronic device if the frame switching instruction is delivered after the VBP phase in the waveform of the frame of Vsync signal in the determining logic of the hardware of the electronic device.

For the software of the electronic device, when adjusting the refresh rate of the display screen of the electronic device (that is, adjusting a frame rate of the display screen), the software of the electronic device collects a time interval between upper two TEs (rising edges) in a waveform of a Vsync signal to calculate the frame rate (namely, the refresh rate of the display screen). After the refresh rate of the display screen of the electronic device is switched from an original refresh rate to the new refresh rate, a time between the first TE of the new frame rate and the last TE of the original refresh rate is still a time of the original refresh rate, and a time between the second TE of the new refresh rate and the first TE of the new refresh rate is a time of the new refresh rate. Therefore, a moment at which the software of the electronic device actually collects that refresh rate switching is completed should be at a rising edge of the second frame of the new refresh rate. In this case, for the hardware of the electronic device, the second frame of the new refresh rate has run for a period of time. Therefore, a time at which the software of the electronic device actually collects real refresh rate adjustment is later than a time at which the hardware of the electronic device performs refresh rate adjustment.

Figure 4:
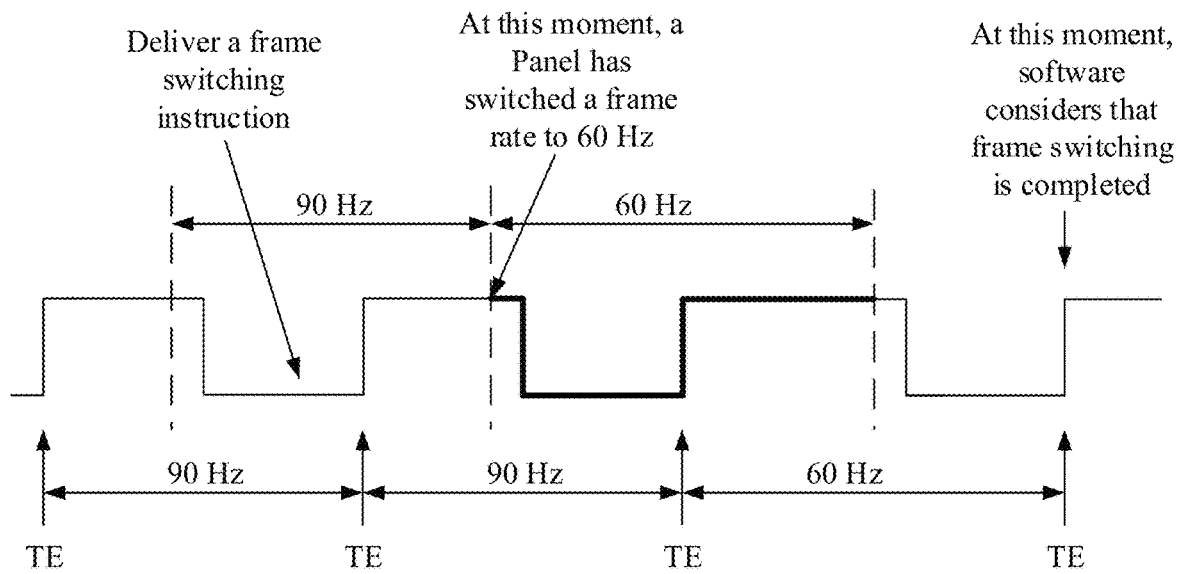
FIG. 4 is a second schematic diagram of a waveform of a Vsync signal during refresh rate switching according to an embodiment of this application.

For example, with reference to FIG. 4, by using an example in which the electronic device adjusts the refresh rate of the display screen from 90 Hz to 60 Hz, the software of the electronic device delivers a frame switching instruction to the hardware of the electronic device at a low level phase in a waveform of one Vsync signal. When a vertical back porch VBP in a waveform of a next Vsync signal arrives, the hardware of the electronic device adjusts the refresh rate of the display screen to 60 Hz. For the software of the electronic device, refresh rate adjustment is not completed in this frame in which the frame switching instruction is delivered, but the refresh rate adjustment is performed only when a next TE arrives.

After the refresh rate of the display screen of the electronic device is switched from the original refresh rate (90 Hz) to the new refresh rate (60 Hz), a time between the first TE of the new refresh rate and the last TE of the original refresh rate is still a time of the original refresh rate (90 Hz), and a time between the second TE of the new refresh rate and the first TE of the new refresh rate is a time of the new refresh rate. Therefore, a moment at which the software of the electronic device actually collects that refresh rate switching is completed is the fourth TE in FIG. 4, namely, a rising edge of the second frame of the new refresh rate. In this case, for the hardware of the electronic device, the second frame of the new refresh rate (60 Hz) has run for a period of time.

It should be noted that FIG. 4 shows a schematic description by using an example in which the electronic device adjusts the refresh rate of the display screen from 90 Hz to 60 Hz, that is, the electronic device switches the refresh rate of the display screen from a high refresh rate to a low refresh rate.

That an adjustment time of the hardware of the electronic device is inconsistent with an adjustment time of the software of the electronic device when a refresh rate of the display screen of the electronic device is adjusted is described below with reference to FIG. 5 by using an example in which the electronic device adjusts the refresh rate of the display screen from 60 Hz to 90 Hz, that is, the electronic device adjusts the refresh rate of the display screen from a low refresh rate to a high refresh rate.

Figure 5:
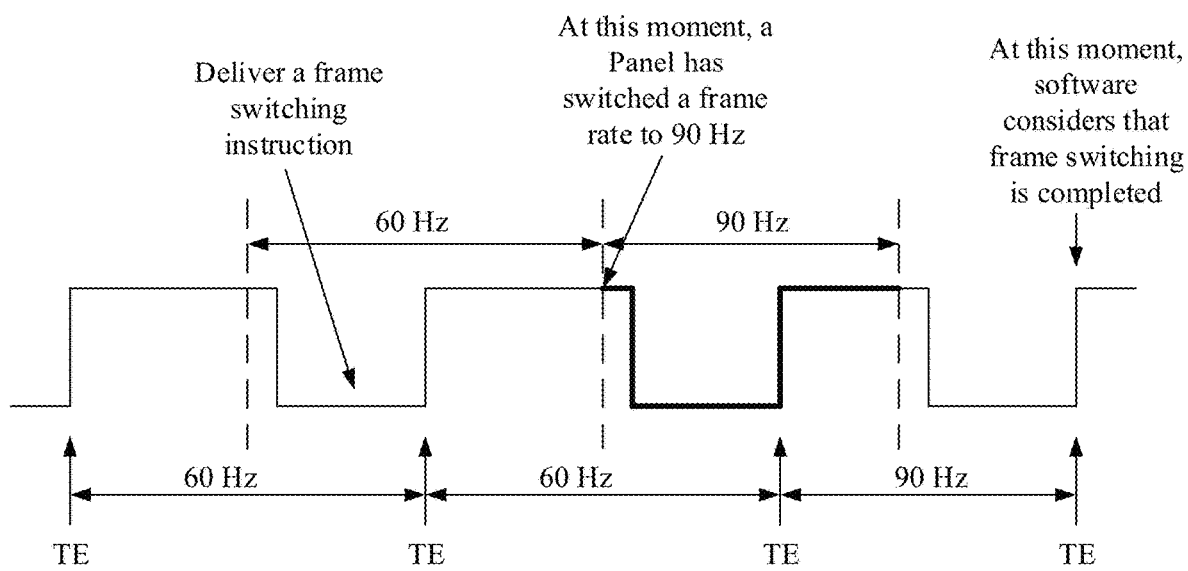
FIG. 5 is a third schematic diagram of a waveform of a Vsync signal during refresh rate switching according to an embodiment of this application.

For example, with reference to FIG. 5, by using an example in which the electronic device adjusts the refresh rate of the display screen from 60 Hz to 90 Hz, the software of the electronic device delivers a frame switching instruction to the hardware of the electronic device at a low level phase in a waveform of one Vsync signal. When a vertical back porch VBP in a waveform of a next Vsync signal arrives, the hardware of the electronic device adjusts the refresh rate of the display screen to 90 Hz. For the software of the electronic device, refresh rate adjustment is not completed in this frame in which the frame switching instruction is delivered, but the refresh rate adjustment is performed only when a next TE arrives. After the refresh rate of the display screen of the electronic device is switched from an original refresh rate (60 Hz) to a new refresh rate (90 Hz), for the software of the electronic device, a time between the first TE of the new refresh rate and the last TE of the original refresh rate is still a time of the original refresh rate (60 Hz), and a time between the second TE of the new refresh rate and the first TE of the new refresh rate is a time of the new refresh rate. Therefore, a moment at which the software of the electronic device actually collects that refresh rate switching is completed is the fourth TE in FIG. 5, namely, a rising edge of the second frame of the new refresh rate. In this case, for the hardware of the electronic device, the second frame of the new refresh rate (60 Hz) has run for a period of time.

It may be learned from the foregoing analysis that, from a perspective of the hardware of the electronic device and a perspective of the software of the electronic device, when a screen refresh rate of the electronic device is adjusted, an adjustment time of the hardware of the electronic device is inconsistent with an adjustment time of the software of the electronic device, that is, a time at which the hardware of the electronic device switches the refresh rate is different from a time at which the software of the electronic device switches the refresh rate. From a perspective of the software of the electronic device, regardless of a scenario in which the screen refresh rate is switched from a high refresh rate to a low refresh rate, or a scenario in which the screen refresh rate is switched from a low refresh rate to a high refresh rate, if a command of switching the refresh rate is delivered in this frame, a refresh rate of this frame does not change and a refresh rate of a next frame does not change either, and a frame after the next frame switches to the new refresh rate. It is equivalent to delaying the frame switching instruction to take effect by one frame after the frame switching instruction is delivered.

It should be noted that, for the software of the electronic device, at a moment at which a TE in a waveform of a Vsync signal arrives, the software of the electronic device sends, to a random access memory (random access memory, RAM) corresponding to the hardware (namely, the Panel) of the electronic device, image data that needs to be displayed. The hardware of the electronic device starts to read the image data from the RAM at a moment at which a falling edge in the waveform of the Vsync signal arrives, and refreshes the image data to the display screen. During the entire low level period in the waveform of the Vsync signal, the Panel refreshes the data to the screen, and does not end refreshing the data until a rising edge arrives. Therefore, to ensure that each frame of image data can be completely sent and correctly and completely refreshed by the Panel to the display screen, the software of the electronic device needs to complete sending all image data before the rising edge in the waveform (namely, a next TE in the waveform of the Vsync signal) arrives.

For a different frame rate (namely, a different refresh rate), duration of a waveform of a Vsync signal of the hardware of the electronic device in one complete period is different. In addition, for a different refresh rate, a time at which the software of the electronic device transmits the image data to the hardware of the electronic device is different, that is, a time at which the software of the electronic device sends the image data to the hardware of the electronic device is different. The time at which the software of the electronic device sends the image data to the hardware of the electronic device is related to a clock frequency of sending the image data and a clock frequency of compressing the image data. To send data faster, higher compression and sending speeds are required, but higher speeds also mean higher power consumption. For the software of the electronic device, it only needs to ensure that sending of the image data is completed before the next TE arrives. There is no need to blindly pursue a speed, and a balance between performance and power consumption needs to be comprehensively considered. Therefore, a configured clock frequency for transmitting the image data is different for a different refresh rate. In this case, a transmission time of the image data at a different refresh rate is different.

To be specific, the time at which the software of the electronic device sends the image data to the hardware of the electronic device includes a time at which the software of the electronic device compresses the image data and a time at which the electronic device sends the compressed image data.

Figure 6:
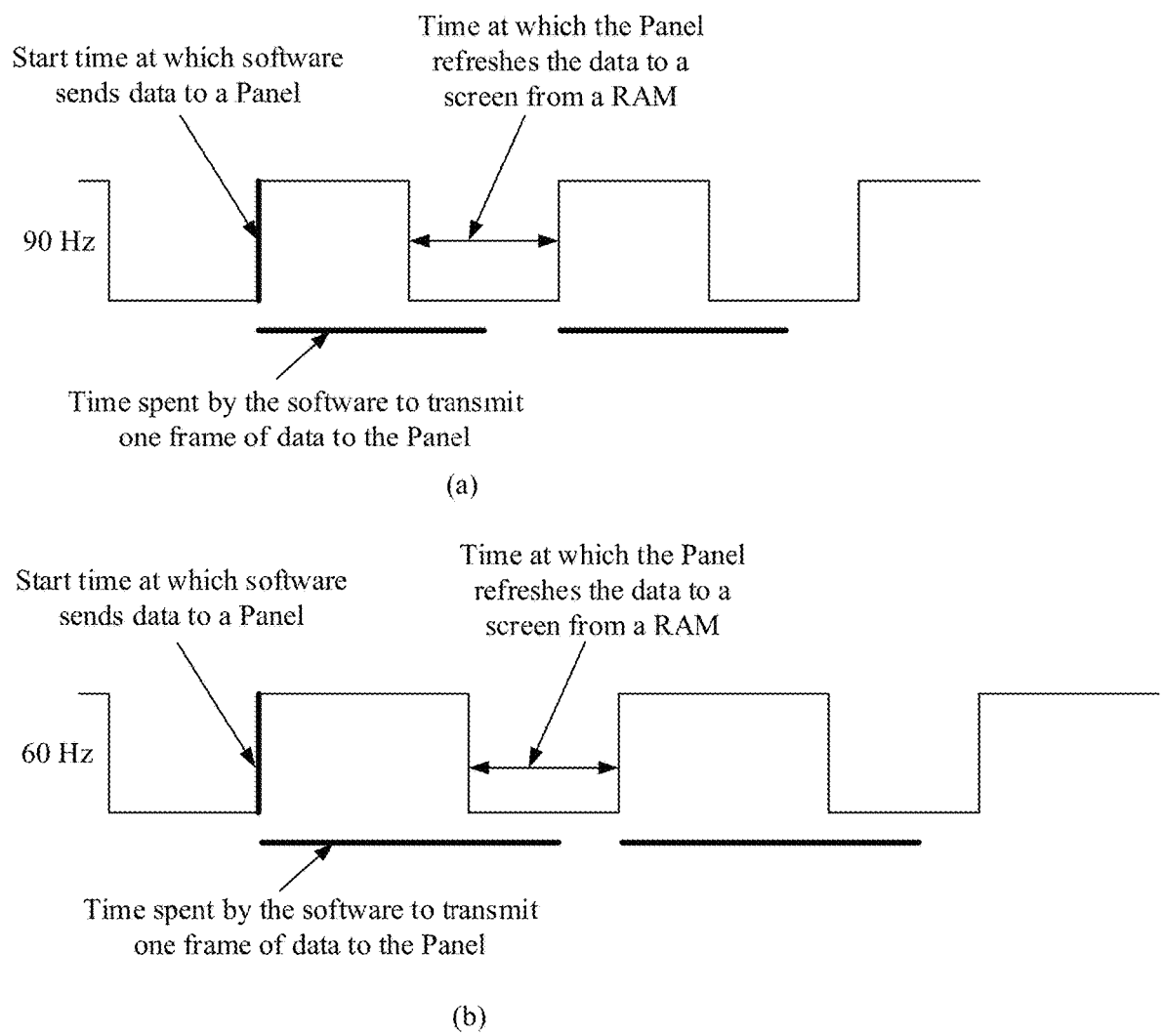
FIG. 6 is a first schematic diagram of a waveform of a Vsync signal during image data transmission according to an embodiment of this application.

With reference to FIG. 6, the following provides a schematic description of times at which the software of the electronic device sends image data to the hardware of the electronic device at different frame rates (that is, different refresh rates of the display screen).

As shown in (a) in FIG. 6, when the refresh rate of the display screen of the electronic device is 90 Hz, when one TE in a waveform of a Vsync signal arrives, the software of the electronic device sends, to the RAM corresponding to the hardware (namely, the Panel) of the electronic device, a first frame of image data that needs to be displayed. When a falling edge in the waveform of the Vsync signal arrives, the hardware of the electronic device starts to read the first frame of image data from the RAM, and refreshes the first frame of image data to the display screen.

During the entire low level period in the waveform of the Vsync signal, the Panel refreshes the image data to the screen, and does not end refreshing the image data until a rising edge arrives. To ensure that the first frame of image data can be completely sent and correctly and completely refreshed by the Panel to the display screen, the software of the electronic device completes sending the first image data before the rising edge in the waveform (namely, a next TE in the waveform of the Vsync signal) arrives. To be specific, a time spent by the software of the electronic device in transmitting one frame of image data to the hardware of the electronic device includes one high-level time and a partial low-level time in a waveform of a Vsync signal.

When the next TE in the waveform of the Vsync signal arrives, the software of the electronic device sends, to the RAM corresponding to the hardware of the electronic device, a next frame of image data that needs to be displayed.

As shown in (b) in FIG. 6, when the refresh rate of the display screen of the electronic device is 60 Hz, when one TE in a waveform of a Vsync signal arrives, the software of the electronic device sends, to the RAM corresponding to the hardware (namely, the Panel) of the electronic device, a first frame of image data that needs to be displayed. When a falling edge in the waveform of the Vsync signal arrives, the hardware of the electronic device starts to read the first frame of image data from the RAM, and refreshes the first frame of image data to the display screen.

During the entire low level period in the waveform of the Vsync signal, the Panel refreshes the image data to the screen, and does not end refreshing the image data until a rising edge arrives. To ensure that the first frame of image data can be completely sent and correctly and completely refreshed by the Panel to the display screen, the software of the electronic device completes sending the first image data before the rising edge in the waveform (namely, a next TE in the waveform of the Vsync signal) arrives. To be specific, a time spent by the software of the electronic device in transmitting one frame of image data to the hardware of the electronic device includes one high-level time and a partial low-level time in a waveform of a Vsync signal.

When the next TE in the waveform of the Vsync signal arrives, the software of the electronic device sends, to the RAM corresponding to the hardware of the electronic device, a next frame of image data that needs to be displayed.

With reference to (a) in FIG. 6 and (b) in FIG. 6, it may be learned that for the different refresh rates of the display screen, the times at which the software of the electronic device sends the image data to the hardware of the electronic device are different. Therefore, when the refresh rate of the display screen of the electronic device is adjusted, the time at which the software of the electronic device sends the image data to the hardware of the electronic device needs to be correspondingly adjusted.

The time at which the software of the electronic device sends the image data to the hardware of the electronic device includes a time at which the software of the electronic device compresses the image data and a time at which the electronic device sends the compressed image data. Therefore, a transmission time adjustment instruction may include a compression time adjustment instruction and a sending time adjustment instruction. The compression time adjustment instruction may be used to adjust a mobile industry processor interface-clock (mobile industry processor interface-clock, Mipi-clk). The sending time adjustment instruction may be used to adjust a mobile display processor-clock (mobile display processor, mdp-clk).

Therefore, when the refresh rate of the display screen of the electronic device is adjusted, the software of the electronic device sends a frame switching instruction to the hardware of the electronic device. While delivering the frame switching instruction, the software of the electronic device delivers the transmission time adjustment instruction, so that the software of the electronic device may correspondingly adjust the time at which the software of the electronic device sends the image data to the hardware of the electronic device (namely, a compression time and a sending time of the image data).

That is, when the refresh rate of the display screen of the electronic device is adjusted, the software of the electronic device delivers, at the same time as the frame switching instruction, instructions for adjusting the Mipi-clk and the mdp-clk. When the refresh rate of the display screen of the electronic device switches from a high refresh rate to a low refresh rate, the compression time and the sending time of the image data need to be reduced, that is, the Mipi-clk and the mdp-clk need to be reduced. In this case, a time for sending the image data to the hardware of the electronic device by the software of the electronic device becomes longer.

Adjustment of the Mipi-clk and the mdp-clk takes effect immediately in a next frame obtained when the software of the electronic device delivers the frame switching instruction. However, at this time, from a software level of the electronic device, a refresh rate of the next frame is not really switched after the frame switching instruction is delivered. A time between the first TE of a new refresh rate and the last TE of an original refresh rate is still a time of the original refresh rate, and a time between the second TE of the new refresh rate and the first TE of the new refresh rate is a time of the new refresh rate. To be specific, the software of the electronic device and the hardware of the electronic device have different determining conditions for a frame switching action. When refresh rate switching occurs, a time at which the software of the electronic device actually completes switching the Mipi-clk and the mdp-clk is the next frame, but actual duration of the next frame is duration corresponding to the original refresh rate. This certainly causes a problem of trampling TE in a process of switching from the high refresh rate to the low refresh rate.

It should be noted that, when one TE arrives, the software of the electronic device starts to transmit one frame of image data to the hardware of the electronic device. When a next TE arrives, the software of the electronic device starts to transmit a next frame of image data to the hardware of the electronic device. Trampling TE means that when the next TE arrives, one frame of image data transmitted by the software of the electronic device to the hardware of the electronic device is not completely transmitted, but the software of the electronic device starts to transmit the next frame of image data to the hardware of the electronic device because the next TE arrives. The software of the electronic device starts to transmit the next frame of image data before completing transmitting one frame of image data. This causes a problem such as freezing occurring on a picture displayed on the display screen of the electronic device.

Figure 7:
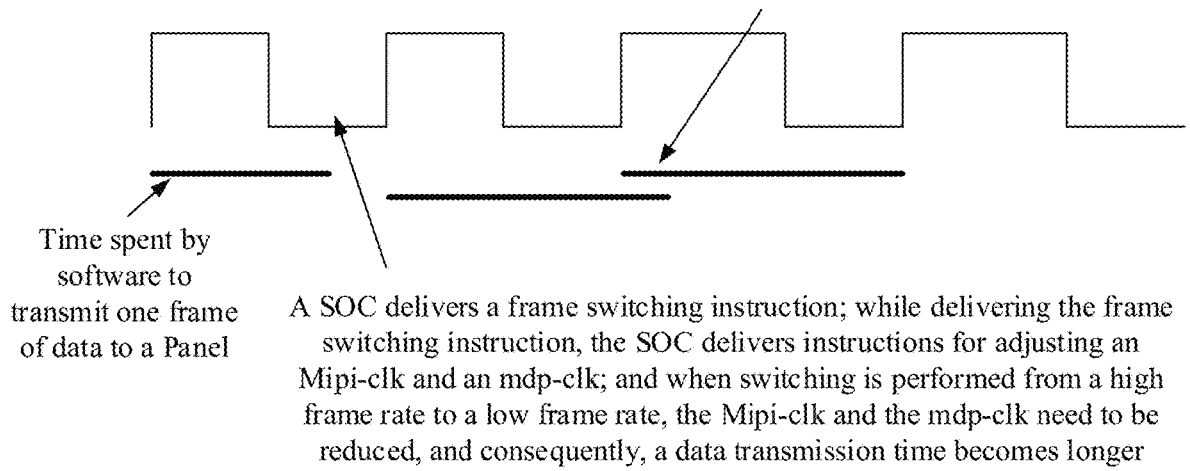
FIG. 7 is a second schematic diagram of a waveform of a Vsync signal during image data transmission according to an embodiment of this application.

With reference to FIG. 7, the following provides a schematic description of a problem of trampling TE in a process of adjusting a refresh rate of the display screen of the electronic device from a high refresh rate to a low refresh rate.

As shown in FIG. 7, when the refresh rate of the display screen of the electronic device is the high refresh rate, duration in which the software of the electronic device transmits one frame of image data to the hardware of the electronic device in a waveform of a Vsync signal is relatively short. When the refresh rate of the display screen of the electronic device is adjusted from the high refresh rate to the low frame rate, while the software of the electronic device (that is, the software in the SOC of the electronic device) delivers a frame switching instruction, the software of the electronic device delivers instructions for adjusting the Mipi-clk and the mdp-clk. When the high refresh rate is adjusted to the low refresh rate, the Mipi-clk and the mdp-clk need to be reduced. This causes a time for transmitting the image data to the hardware of the electronic device by the software of the electronic device to become longer.

For the software of the electronic device, a new refresh rate does not take effect in a next frame obtained when the software of the electronic device delivers the frame switching instruction, and the new refresh rate takes effect in a frame after the next frame. That is, duration corresponding to the next frame obtained when the software of the electronic device delivers the frame switching instruction is duration corresponding to the high refresh rate. However, a new Mipi-clk and a new mdp-clk take effect in the next frame obtained when the software of the electronic device delivers the frame switching instruction. To be specific, in the next frame obtained when the software of the electronic device delivers the frame switching instruction, duration in which the software of the electronic device transmits one frame of image data to the hardware of the electronic device is adjusted to duration corresponding to the low refresh rate. The duration corresponding to the low refresh rate is relatively long. However, the duration corresponding to the next frame obtained when the software of the electronic device delivers the frame switching instruction is the duration corresponding to the high refresh rate. A time that is for transmitting the image data and that corresponds to the next frame obtained when the software of the electronic device delivers the frame switching instruction exceeds the duration corresponding to the next frame obtained when the software of the electronic device delivers the frame switching instruction. When a frame after the next frame obtained when the software of the electronic device delivers the frame switching instruction arrives, the software of the electronic device transmits a next frame of image data to the hardware of the electronic device. In this case, within the duration of the next frame obtained when the software of the electronic device delivers the frame switching instruction, the image data transmitted by the software of the electronic device to the hardware of the electronic device is not completely transmitted, causing a trampling TE phenomenon.

In other words, a transmission time becomes longer after the electronic device modifies a transmission rate of an Mipi. The transmission time exceeds total duration of a frame rate at this time, causing the trampling TE phenomenon. The next frame of image data starts to be transmitted before transmission of one frame of image data is completed. Consequently, a phenomenon such as blurring occurs on a screen of the electronic device. The next frame of image data starts to be transmitted before the transmission of one frame of image data is completed. Consequently, in a process of adjusting the refresh rate of the display screen of the electronic device, a problem such as freezing occurs on a picture displayed on the screen of the electronic device.

When the refresh rate of the display screen of the electronic device is adjusted, the software of the electronic device needs to switch the Mipi-clk and the mdp-clk when switching the refresh rate, which also needs to take some time. When the refresh rate of the display screen of the electronic device is switched from the low refresh rate to the high refresh rate, if it takes an excessively long time to switch the Mipi-clk and the mdp-clk, it may cause the software of the electronic device to lose one frame of data. When the refresh rate of the display screen of the electronic device is the low frame rate, the software of the electronic device needs to complete sending the image data, and then perform refresh rate switching. In this case, there may be only an extremely short time before a next TE arrives. If delivering of the frame switching instruction and switching of the Mipi-clk and the mdp-clk cannot be completed in this period of time, the software of the electronic device is not ready for sending the image data when a next TE signal arrives. In other words, the software of the electronic device misses one TE signal, and consequently, one frame of image data is lost.

Figure 8:
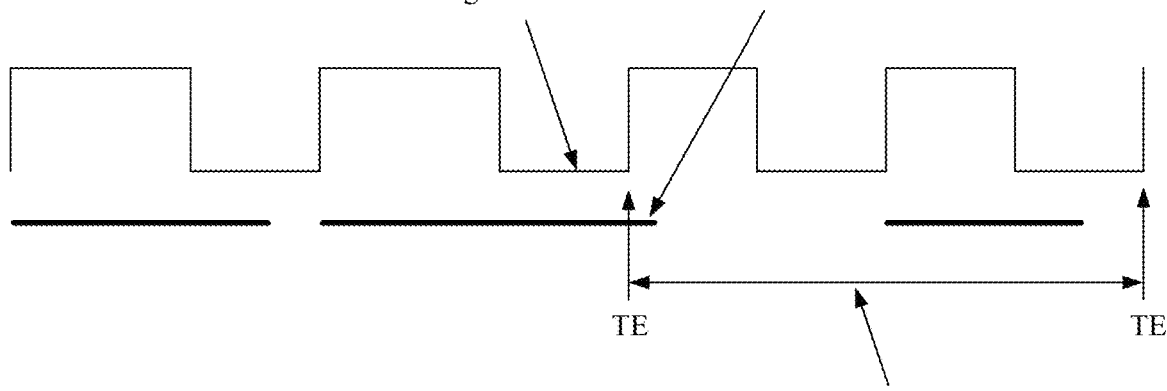
FIG. 8 is a third schematic diagram of a waveform of a Vsync signal during image data transmission according to an embodiment of this application.

With reference to FIG. 8, the following provides a schematic description of a frame of image data lost by the software of the electronic device in a process of adjusting a refresh rate of the display screen of the electronic device from a low refresh rate to a high refresh rate.

As shown in FIG. 8, when the refresh rate of the display screen of the electronic device is the low refresh rate, duration in which the software of the electronic device transmits one frame of image data to the hardware of the electronic device in a waveform of a Vsync signal is relatively long. When the refresh rate of the display screen of the electronic device is adjusted from the low refresh rate to the high frame rate, while the software of the electronic device (that is, the software in the SOC of the electronic device) delivers a frame switching instruction, the software of the electronic device delivers instructions for switching the Mipi-clk and the mdp-clk. Because it takes time to switch the Mipi-clk and the mdp-clk, if a time for switching the Mipi-clk and the mdp-clk is excessively long, the software of the electronic device is not ready for sending the image data when a next TE signal arrives. In other words, the software of the electronic device misses one TE signal (namely, a TE signal corresponding to a next frame obtained when the software of the electronic device delivers a frame switching instruction), and consequently, one frame of image data is lost.

Within this period of time of the next frame obtained when the software of the electronic device delivers the frame switching instruction and a frame after the next frame, the software of the electronic device should send two frames of image data to the hardware of the electronic device, but actually sends only one frame of image data. This is equivalent to that the software of the electronic device loses one frame of image data during drawing. In some scenarios, a relatively obvious freezing phenomenon can be seen.

In conclusion, when the refresh rate of the display screen of the electronic device is adjusted, the frame switching action in the determining logic of the hardware of the electronic device is inconsistent with the frame switching action in the determining logic of the software of the electronic device. In this case, in the process of adjusting the refresh rate of the display screen of the electronic device, a problem such as freezing occurs on the picture displayed on the screen of the electronic device.

To resolve an artifact problem caused by the trampling TE phenomenon when the display refresh rate of the electronic device is switched from the high refresh rate to the low refresh rate, the software of the electronic device does not send image data to the hardware of the electronic device in a delay phase by adding a forced delay in the conventional technology. The software of the electronic device does not send image data to the hardware of the electronic device in the delay phase in the conventional technology, avoiding the artifact problem caused by the trampling TE phenomenon. However, in the conventional technology, image data is lost during drawing, causing a relatively obvious freezing phenomenon.

Figure 9:
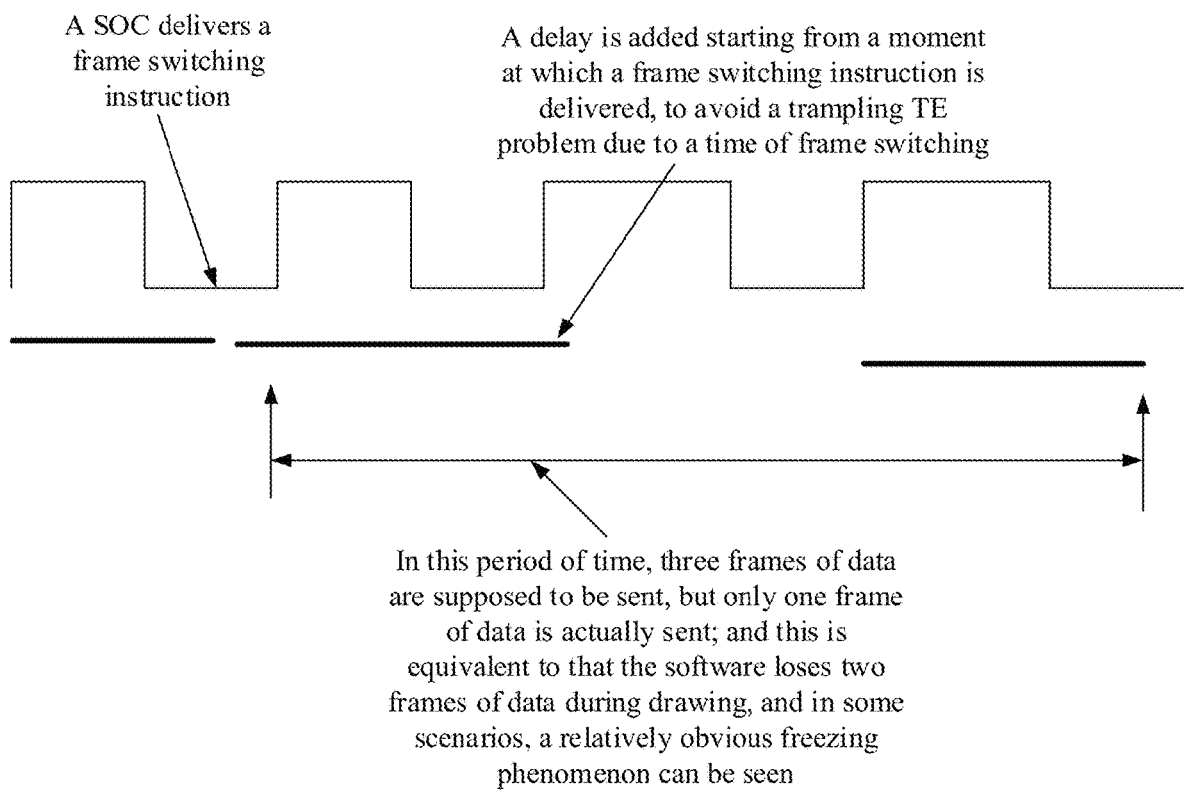
FIG. 9 is a schematic diagram of a waveform of a Vsync signal during image data transmission according to a related technology.

As shown in FIG. 9, in the conventional technology, when a display refresh rate of the electronic device is switched from a high refresh rate to a low refresh rate, and when the software of the electronic device delivers a frame switching instruction, a delay starts to be added. The software of the electronic device does not send image data to the hardware of the electronic device in a delay phase, thereby avoiding a trampling TE problem caused by frame switching. However, in this period of time from a next frame obtained when the software of the electronic device delivers the frame switching instruction to a time at which the software of the electronic device sends image data to the hardware of the electronic device, the software of the electronic device should send three frames of image data to the hardware of the electronic device, but the software of the electronic device actually sends only one frame of image data to the hardware of the electronic device. This is equivalent to that the software of the electronic device loses two frames of image data during drawing. In some scenarios, a relatively obvious freezing phenomenon can be seen. It may be learned that, a problem such as freezing occurring on the picture displayed on the screen of the electronic device in the process of adjusting the refresh rate of the display screen of the electronic device is not resolved in this related technology.

To resolve the foregoing problem, an embodiment of this application provides a refresh rate switching method, applied to an electronic device. When a refresh rate of a display screen of the electronic device is switched from a high refresh rate to a low refresh rate, software of the electronic device may first deliver a frame switching instruction to hardware of the electronic device, and the hardware of the electronic device switches the refresh rate of the display screen from the high refresh rate to the low refresh rate. After the software of the electronic device determines that refresh rate switching is completed, the software of the electronic device switches a time for transmitting image data from a time corresponding to the high refresh rate to a time corresponding to the low refresh rate. When the software of the electronic device delivers a frame rate switching instruction, the software of the electronic device does not adjust a time at which the software of the electronic device transmits image data to the hardware of the electronic device. This can avoid a problem of trampling TE when the refresh rate of the display screen of the electronic device is switched from the high refresh rate to the low refresh rate, and can avoid a problem such as freezing occurring on a picture displayed on the screen of the electronic device in a process of adjusting the refresh rate of the display screen of the electronic device.

Figure 10:
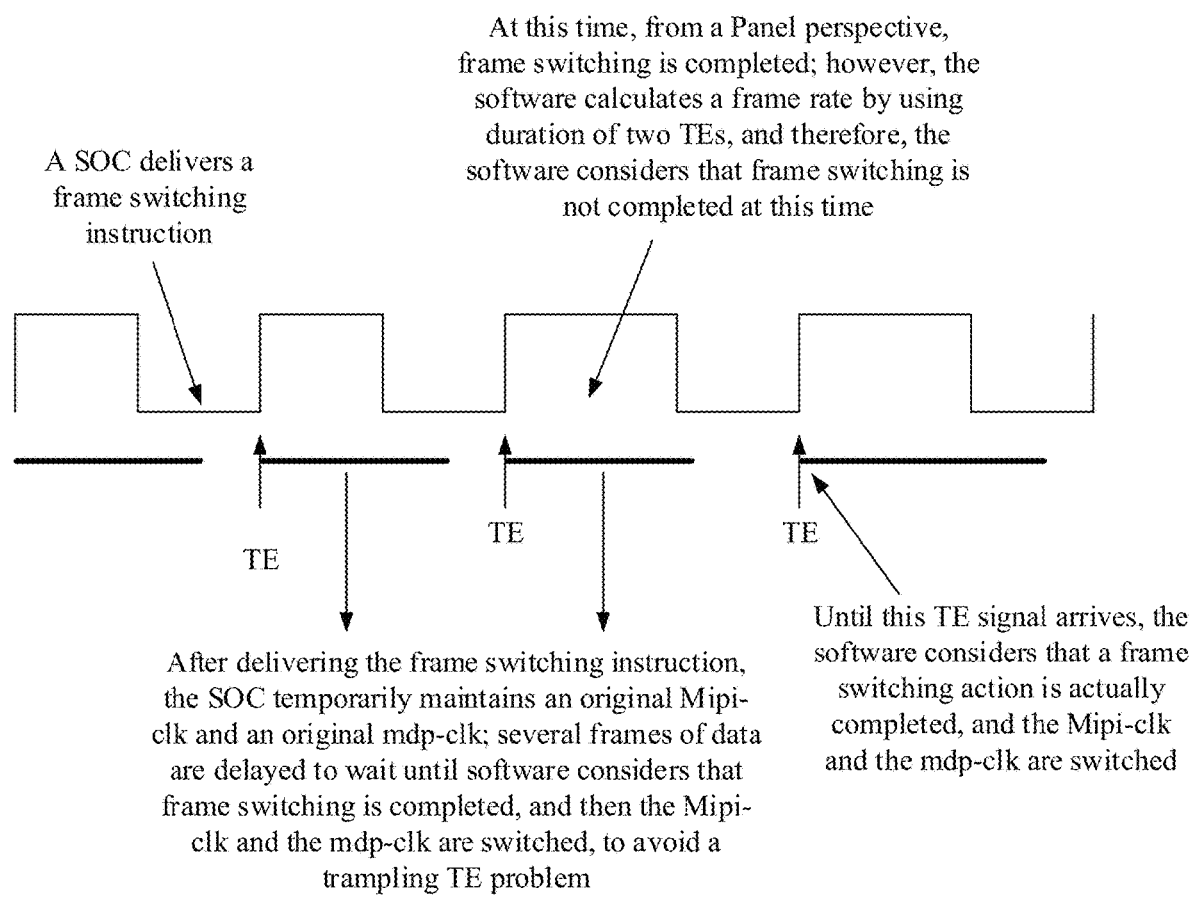
FIG. 10 is a fourth schematic diagram of a waveform of a Vsync signal during image data transmission according to an embodiment of this application.

For example, with reference to FIG. 10, when a refresh rate of the display screen of the electronic device is switched from a high refresh rate to a low refresh rate, the software of the electronic device delivers a frame switching instruction in the first frame (namely, the first Vsync signal). The hardware of the electronic device starts to switch the refresh rate of the display screen from the high refresh rate to the low refresh rate in a next frame, and a new refresh rate takes effect after one frame delay. To be specific, from a perspective of the hardware of the electronic device, frame switching is completed. However, the software of the electronic device calculates a refresh rate by using duration of two TEs. Therefore, in this case, refresh rate switching is not completed in determining logic of the software of the electronic device. In other words, after the software of the electronic device delivers the frame switching instruction, an original Mipi-clk and an original mdp-clk are temporarily maintained. After a delay of several frames, and after frame switching is completed in the determining logic of the software of the electronic device, the Mipi-clk and the mdp-clk are switched, to avoid a problem of trampling TE. To be specific, after the frame switching instruction is delivered in the first frame (namely, the first Vsync signal), the original Mipi-clk and the original mdp-clk are maintained in the second frame and the third frame. When the fourth frame arrives, the software of the electronic device determines that refresh rate switching is completed, and the software of the electronic device switches an Mipi-clk and an mdp-clk corresponding to the high refresh rate to an Mipi-clk and an mdp-clk corresponding to the low refresh rate.

In the solution in this embodiment of this application, when a refresh rate of the display screen of the electronic device is switched from a low refresh rate to a high refresh rate, the software of the electronic device delivers an instruction for adjusting a time for transmitting image data while delivering a frame switching instruction to the hardware of the electronic device. The hardware of the electronic device switches the refresh rate of the display screen from the high refresh rate to the low refresh rate, and the software of the electronic device adjusts the time for transmitting the image data from a time corresponding to the low refresh rate to a time corresponding to the high refresh rate. When the software of the electronic device adjusts the time for transmitting the image data from the time corresponding to the low refresh rate to the time corresponding to the high refresh rate, the software of the electronic device exits a low power mode without re-enabling the low power mode. After the software of the electronic device determines that refresh rate switching is completed, the software of the electronic device enables the low power mode.

When the software of the electronic device adjusts the time for transmitting the image data from the time corresponding to the low refresh rate to the time corresponding to the high refresh rate, the software of the electronic device exits the low power mode without re-enabling the low power mode. This can shorten duration of adjusting the time for transmitting the image data. Therefore, it can be avoided that the duration of adjusting the time for transmitting the image data exceeds duration corresponding to the next frame obtained when the software of the electronic device delivers the frame switching instruction, which causes a phenomenon such as blurring occurring on the screen of the electronic device because a next frame of image data starts to be transmitted before transmission of one frame of image data is completed.

The following describes the refresh rate switching method provided in the embodiments of this application.

The refresh rate switching method provided in the embodiments of this application may be applied to an electronic device. In some embodiments, the electronic device may be an electronic device with an application, for example, a mobile phone, a tablet computer, a handheld computer, a personal computer (personal computer, PC), a cellular phone, a personal digital assistant (personal digital assistant, PDA), or a wearable device. A specific form of the electronic device is not limited herein in the embodiments of this application.

Figure 11:
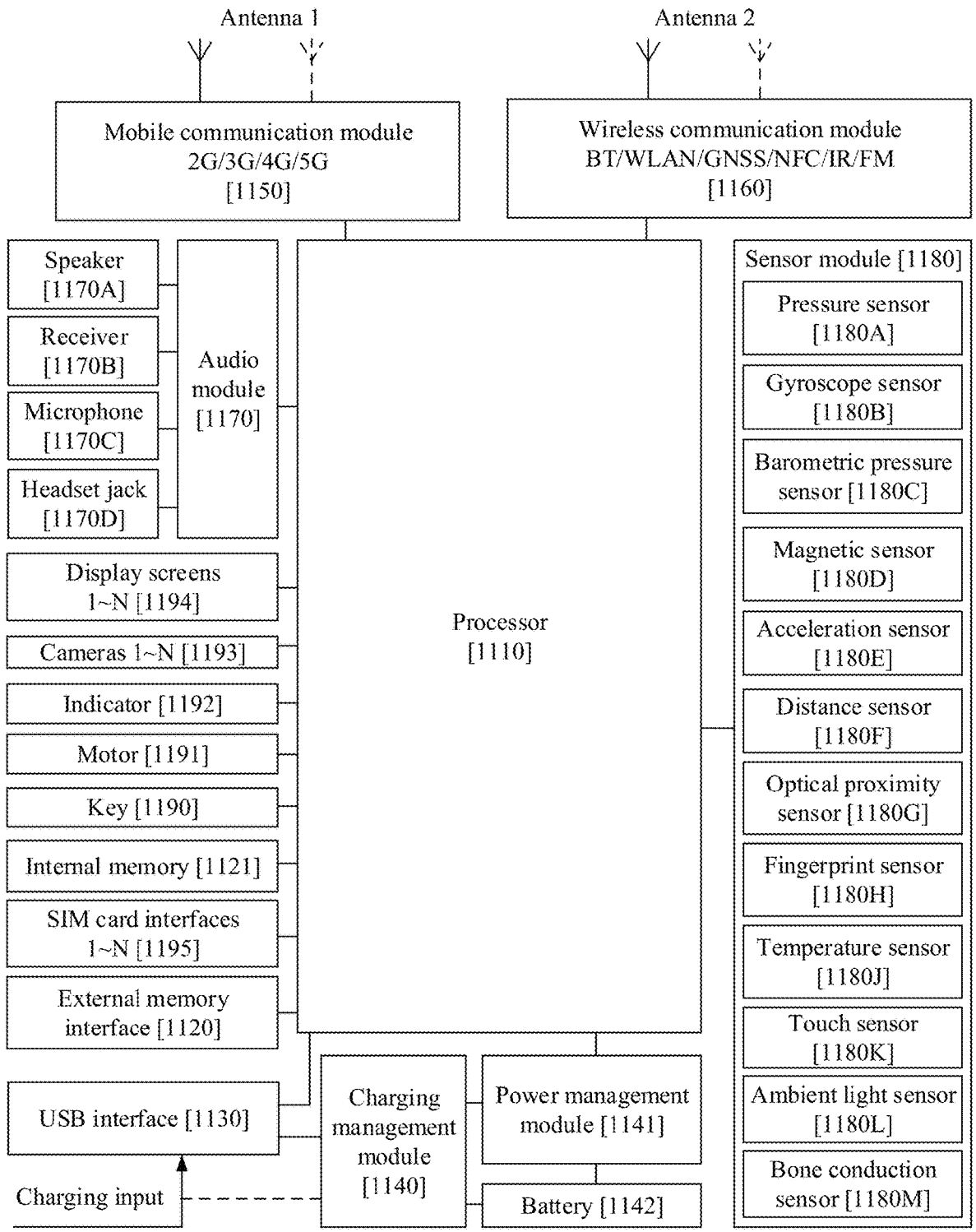
FIG. 11 is a schematic diagram of a hardware structure of an electronic device according to an embodiment of this application.

For example, the electronic device is a mobile phone. FIG. 11 is a schematic diagram of a structure of an electronic device according to an embodiment of this application.

As shown in FIG. 11, the electronic device may include a processor 1110, an external memory interface 1120, an internal memory 1121, a universal serial bus (universal serial bus, USB) interface 1130, a charging management module 1140, a power management module 1141, a battery 1142, an antenna 1, an antenna 2, a mobile communication module 1150, a wireless communication module 1160, an audio module 1170, a speaker 1170A, a receiver 1170B, a microphone 1170C, a headset jack 1170D, a sensor module 1180, a key 1190, a motor 1191, an indicator 1192, a camera 1193, a display screen 1194, a subscriber identification module (subscriber identification module, SIM) card interface 1195, and the like. The sensor module 1180 may include a pressure sensor 1080A, a gyroscope sensor 1180B, a barometric pressure sensor 1180C, a magnetic sensor 1180D, an acceleration sensor 1180E, a distance sensor 1180F, an optical proximity sensor 1180G, a fingerprint sensor 1180H, a temperature sensor 1180J, a touch sensor 1180K, an ambient light sensor 1180L, a bone conduction sensor 1180M, and the like.

It may be understood that the structure shown in this embodiment does not specifically limit the electronic device. In some other embodiments, the electronic device may include more or fewer components than those shown in the figure, or combine some components, or split some components, or have different component arrangements. The components shown in the figure may be implemented by using hardware, software, or a combination of software and hardware.

The processor 1110 may include one or more processing units. For example, the processor 1110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

In some examples, the processor 1110 may be a system on chip SOC of the electronic device.

The controller may be a nerve center and a command center of the electronic device. The controller may generate an operation control signal based on instruction operation code and a timing signal, to control instruction fetching and instruction execution.

A memory may be further disposed in the processor 1110, and is configured to store instructions and data. In some embodiments, the memory in the processor 1110 is a cache memory. The memory may store instructions or data just used or cyclically used by the processor 1110. If the processor 1110 needs to use the instructions or the data again, the processor 1110 may directly invoke the instructions or the data from the memory. This avoids repeated access and reduces waiting time of the processor 1110, thereby improving system efficiency.

In some embodiments, the processor 1110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the electronic device may be implemented by using the antenna 1, the antenna 2, the mobile communication module 1150, the wireless communication module 1160, the modem processor, the baseband processor, and the like.

The antenna 1 and the antenna 2 are configured to transmit and receive electromagnetic wave signals. Each antenna in the electronic device may be configured to cover one or more communication bands. Different antennas may be further multiplexed to improve antenna utilization. For example, the antenna 1 may be multiplexed as a diversity antenna for a wireless local area network. In some other embodiments, the antenna may be used in combination with a tuning switch.

The mobile communication module 1150 may provide a solution for wireless communication including 2G/3G/4G/5G and the like applied to the electronic device. The mobile communication module 1150 may include at least one filter, a switch, a power amplifier, a low noise amplifier (low noise amplifier, LNA), and the like. The mobile communication module 1150 may receive an electromagnetic wave by using the antenna 1, perform processing such as filtering or amplification on the received electromagnetic wave, and send a processed electromagnetic wave to the modem processor for demodulation. The mobile communication module 1150 may further amplify a signal modulated by the modem processor, and convert the signal into an electromagnetic wave by using the antenna 1 for radiation. In some embodiments, at least some functional modules of the mobile communication module 1150 may be disposed in the processor 1110. In some embodiments, at least some functional modules of the mobile communication module 1150 may be disposed in a same device as at least some modules of the processor 1110.

The wireless communication module 1160 may provide a solution for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like applied to the electronic device. The wireless communication module 1160 may be one or more devices integrating at least one communication processing module. The wireless communication module 1160 receives an electromagnetic wave by using the antenna 2, performs frequency modulation and filtering processing on an electromagnetic wave signal, and sends a processed signal to the processor 1110. The wireless communication module 1160 may further receive a to-be-sent signal from the processor 1110, perform frequency modulation and amplification on the signal, and convert, by using the antenna 2, the signal into an electromagnetic wave for radiation.

In some embodiments, the antenna 1 and the mobile communication module 1150 of the electronic device are coupled, and the antenna 2 and the wireless communication module 1160 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like.

The electronic device implements a display function by using the GPU, the display screen 1194, the application processor, and the like. The GPU is a microprocessor for image processing and is connected to the display screen 1194 and the application processor. The GPU is configured to perform mathematical and geometric computing for graphics rendering. The processor 1010 may include one or more GPUs that execute program instructions to generate or change display information.

The display screen 1194 is configured to display an image, a video, and the like. The display screen 1194 includes a display panel. The display panel may be a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device may include one or N display screens 1194, where N is a positive integer greater than 1.

The electronic device may implement a shooting function by using the ISP, the camera 1093, the video codec, the GPU, the display screen 1194, the application processor, and the like. In some embodiments, the electronic device may include one or N cameras 1193, where N is a positive integer greater than 1.

The internal memory 1121 may be configured to store computer-executable program code, and the executable program code includes instructions. The processor 1110 executes various functional applications and data processing of the electronic device by running the instructions stored in the internal memory 1121. The internal memory 1121 may include a program storage area and a data storage area. The program storage area may store an operating system, an application required by at least one function (for example, a sound playback function or an image playback function), and the like. The data storage area may store data (for example, audio data and a phone book) and the like created during use of the electronic device. In addition, the internal memory 1121 may include a high-speed random access memory, and may further include a non-volatile memory such as at least one magnetic disk storage device, a flash memory device, or a universal flash storage (universal flash storage, UFS).

The acceleration sensor 1180E may periodically collect acceleration data of the electronic device at a specific frequency, for example, may collect magnitudes of acceleration of the electronic device in all directions (which are usually an X-axis direction, a Y-axis direction, and a Z-axis direction).

Certainly, it may be understood that FIG. 11 merely shows an example for description when a form of the electronic device is a mobile phone. If the electronic device is in another device form such as a tablet computer, a handheld computer, a PC, a PDA, or a wearable device (for example, a smartwatch or a smart band), the structure of the electronic device may include fewer structures than those shown in FIG. 11 or may include more structures than those shown in FIG. 11. This is not limited herein.

It may be understood that a function of the electronic device usually needs to be implemented based on cooperation of software in addition to support of hardware.

A software system of the electronic device may use a layered architecture, an event-driven architecture, a microkernel architecture, a microservice architecture, or a cloud architecture. In this embodiment of this application, an Android system with the layered architecture is used as an example to describe a software structure of the electronic device.

Figure 12:
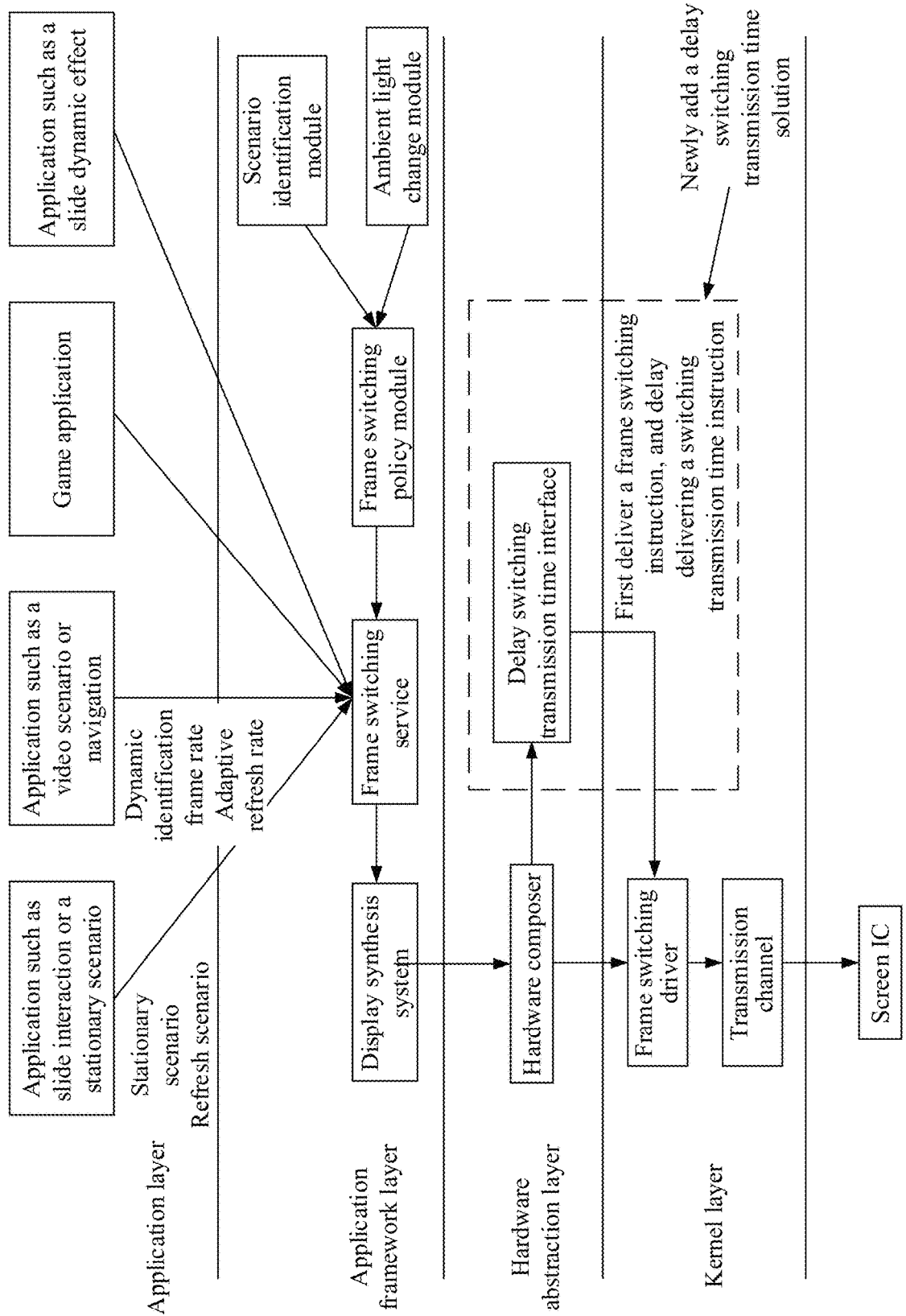
FIG. 12 is a schematic diagram of a software structure of an electronic device according to an embodiment of this application.

FIG. 12 is a block diagram of a software structure of an electronic device according to an embodiment of this application.

In a layered architecture, software is divided into several layers, and each layer has a clear role and task. The layers communicate with each other through a software interface. In some embodiments, the Android system is divided into four layers from top to bottom: an application layer, an application framework layer, a hardware abstraction layer, and a kernel layer.

The application layer may include a series of applications. The application may include an application whose display frame rate can change dynamically. As shown in FIG. 12, the application whose display frame rate can change dynamically may include an application such as slide interaction or a stationary scenario, an application such as a video scenario or navigation, a game application, and an application such as a slide dynamic effect. A display frame rate corresponding to a stationary scenario of the application such as the slide interaction or the stationary scenario is different from that corresponding to a refresh scenario. The application such as the video scenario or the navigation can change a display frame rate in a manner of a dynamic identification frame rate, an adaptive refresh rate, or the like.

The applications may further include applications such as Camera, Gallery, Calendar, Phone, Map, Navigation, WLAN, Bluetooth, Music, Videos, and Messages.

The application framework layer provides an application programming interface (application programming interface, API) and a programming framework for the application at the application layer. The application framework layer includes some predefined functions.

As shown in FIG. 12, the application framework layer may include a display synthesis system (namely, SurfaceFlinger), a frame switching service, a frame switching policy module, a scenario identification module, and an ambient light change module.

In some examples, when a display frame rate of an application changes, the application may notify the frame switching service. When the frame switching service receives a notification that the display frame rate of the application changes, the frame switching service may determine, by using the frame switching policy module, a target refresh rate to which a refresh rate of a display screen of the electronic device needs to be adjusted. The frame switching policy module may determine, by using the scenario identification module and the ambient light change module, the target refresh rate to which the refresh rate of the display screen of the electronic device needs to be adjusted. When the frame switching service determines the target refresh rate to which the refresh rate of the display screen of the electronic device needs to be adjusted, the frame switching service may notify the display synthesis system, and the display synthesis system notifies a hardware composer (HWC) at the hardware abstraction layer.

The application framework layer may further include a window manager, a content provider, a view system, a phone manager, a resource manager, a notification manager, and the like.

The window manager is configured to manage a window program. The window manager may obtain a size of a display screen, determine whether a status bar exists, lock a screen, take a screenshot, and the like.

The content provider is configured to store and obtain data, and enable the data to be accessible to an application. The data may include a video, an image, audio, calls that are made and answered, a browsing history and bookmarks, a phone book, and the like.

The view system includes visual controls such as a text display control and a picture display control. The view system may be configured to construct an application. A display interface may include one or more views. For example, a display interface including a Messages notification icon may include a view for displaying text and a view for displaying a picture.

The phone manager is configured to provide a communication function of the electronic device, for example, call status management (including answering, hanging up, and the like).

The resource manager provides various resources for an application, for example, a localized string, an icon, a picture, a layout file, and a video file.

The notification manager enables an application to display notification information in a status bar, and may be configured to convey a notification message that may automatically disappear after a short stay without requiring user interaction. For example, the notification manager is configured to provide a notification of download completion, a message reminder, and the like. The notification manager may be further a notification that appears in the status bar at the top of the system in a form of a graph or scroll bar text, for example, a notification of an application running in the background, or a notification that appears on a screen in a form of a dialog window. For example, text information is prompted in the status bar, an alert sound is made, the electronic device vibrates, or an indicator light blinks.

The hardware abstraction layer (hardware abstraction layer, HAL) is an interface layer located between an operating system kernel and a hardware circuit, and is used to abstract hardware. The hardware abstraction layer may include the hardware composer (HWC).

In some examples, when the hardware composer receives a notification that is sent by the display synthesis system for switching the refresh rate of the display screen of the electronic device, the hardware composer may send a frame switching instruction to a frame switching driver at the kernel layer of the electronic device by using a delay switching transmission time interface (namely, a displaySetFps interface). After the hardware composer determines that refresh rate switching is completed, the hardware composer sends a switching transmission time instruction to the frame switching driver at the kernel layer of the electronic device by using the delay switching transmission time interface. That is, in the solutions of this application, a delay switching transmission time solution may be newly added by using the delay switching transmission time interface.

It should be noted that, in the conventional technology, when the hardware composer receives the notification that is sent by the display synthesis system for switching the refresh rate of the display screen of the electronic device, the hardware composer directly sends the frame switching instruction (which may also be referred to as a switching instruction) and the switching transmission time instruction to the frame switching driver at the kernel layer of the electronic device.

The kernel (Kernel) layer may include the frame switching driver, a transmission channel, and the like. The transmission channel may be a display serial interface (display serial interface, DSI).

In some examples, after the frame switching driver receives the frame switching instruction that is sent by the hardware composer to the frame switching driver by using the delay switching transmission time interface, the frame switching driver may send the frame switching instruction to a screen IC (namely, a display screen IC) by using the transmission channel, so that the screen IC may adjust the refresh rate of the display screen.

Methods in the following embodiments may all be implemented in an electronic device having the foregoing hardware structure or software structure.

Figure 13A:
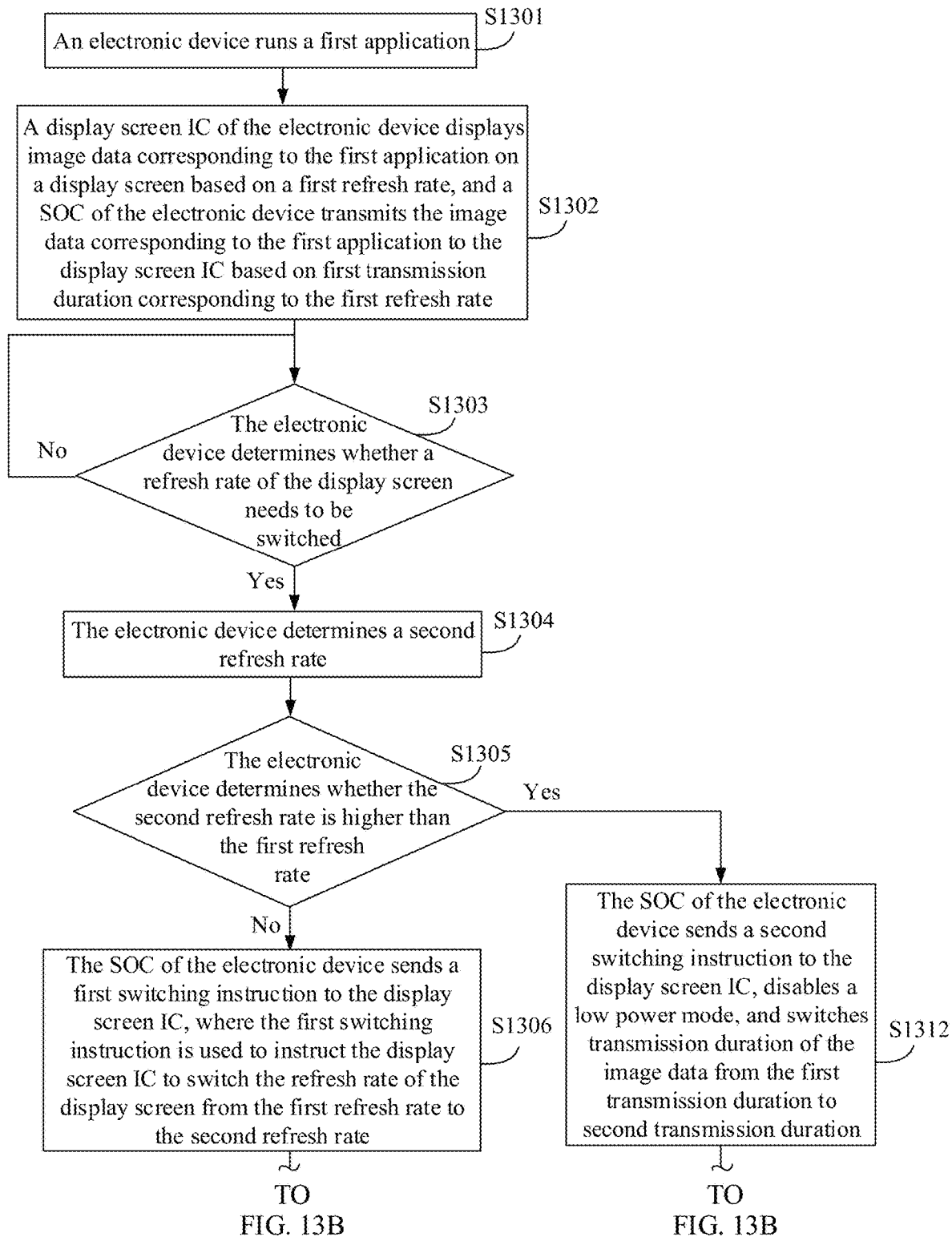
FIG. 13A and FIG. 13B are a schematic flowchart of a refresh rate switching method according to an embodiment of this application.
Figure 13B:
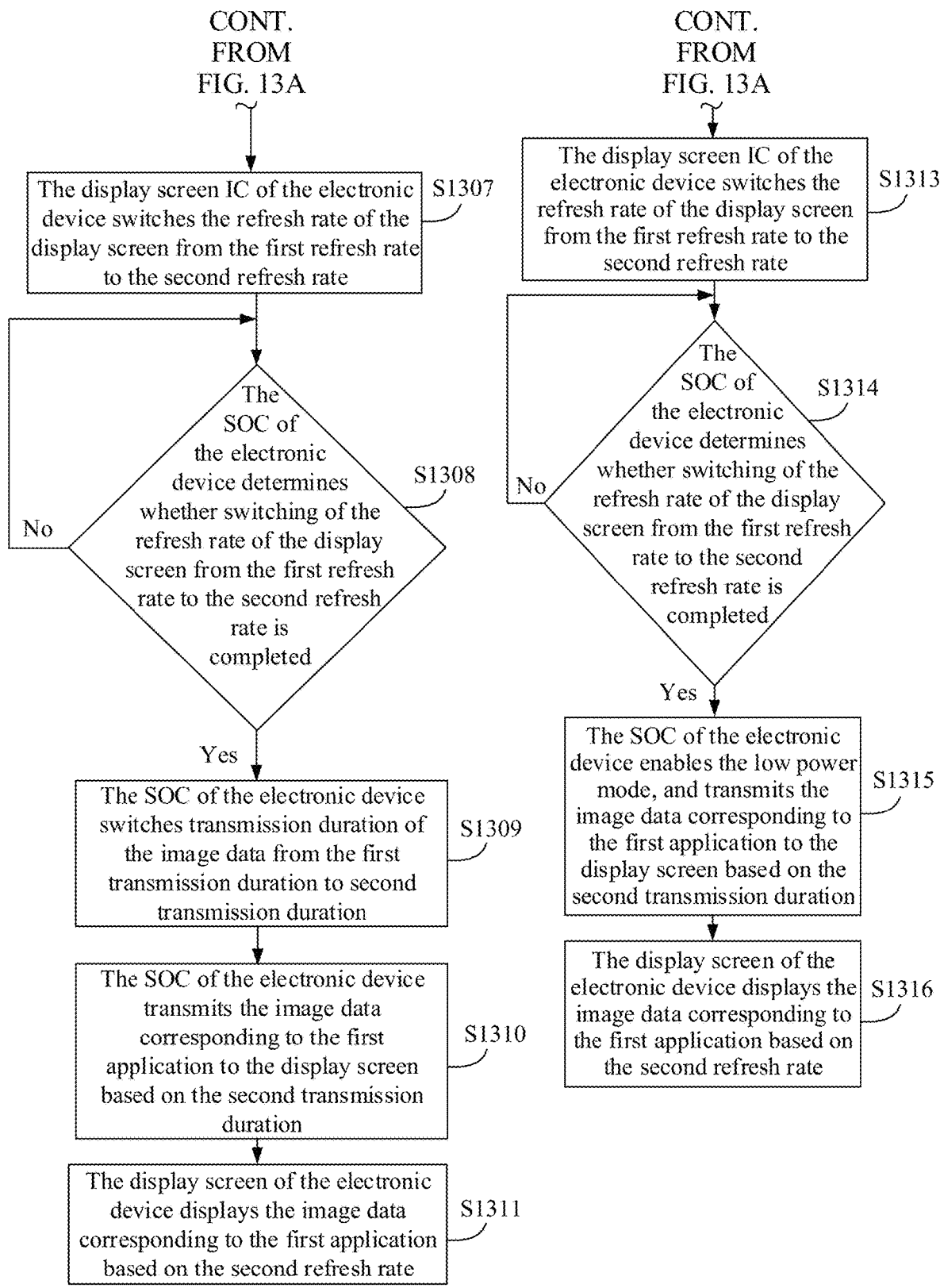

A refresh rate switching method provided in an embodiment of this application is described in detail below with reference to FIG. 13A and FIG. 13B. FIG. 13A and FIG. 13B are a schematic flowchart of a refresh rate switching method according to an embodiment of this application. As shown in FIG. 13A and FIG. 13B, the refresh rate switching method may include the following S1301-S1316.

S1301: An electronic device runs a first application.

The electronic device may run the first application. The first application may be an application that is in the electronic device and that can switch a display frame rate of the application. For example, the first application may include an application that can switch a display frame rate of the application, such as a game application, a video application, or a navigation application. A specific type of the first application is not limited in this embodiment of this application.

S1302: A display screen IC of the electronic device displays image data corresponding to the first application on a display screen based on a first refresh rate, and a SOC of the electronic device transmits the image data corresponding to the first application to the display screen IC based on first transmission duration corresponding to the first refresh rate.

When the electronic device runs the first application, the display screen integrated circuit IC (which may also be referred to as a screen IC) of the electronic device may display the image data corresponding to the first application on the display screen based on the first refresh rate. A first refresh rate is a current refresh rate of the display screen of the electronic device.

When the electronic device runs the first application, the SOC of the electronic device may transmit the image data corresponding to the first application to the display screen IC based on the first transmission duration corresponding to the first refresh rate.

The first transmission duration is duration in which the SOC of the electronic device sends one frame of image data to the display screen IC of the electronic device when a refresh rate of the display screen of the electronic device is the first refresh rate.

In some examples, the first transmission duration may include duration in which the SOC of the electronic device compresses one frame of image data and duration in which the SOC of the electronic device sends one frame of image data to the display screen IC when the refresh rate of the display screen of the electronic device is the first refresh rate.

S1303: The electronic device determines whether the refresh rate of the display screen needs to be switched.

When the electronic device runs the first application, the electronic device may display the image data corresponding to the first application based on the current refresh rate (namely, the first refresh rate) of the display screen. In a process in which the electronic device displays the image data based on the current refresh rate of the display screen, the electronic device may determine whether the refresh rate of the display screen needs to be switched. The refresh rate of the display screen is a screen refresh rate, and refers to a quantity of times that the display screen can refresh displayed image data per second.

The current refresh rate of the display screen may be 60 Hz, 90 Hz, 120 Hz, or the like. A specific value of the current refresh rate of the display screen is not limited in this embodiment of this application.

When the electronic device determines that the refresh rate of the display screen does not need to be switched, the electronic device may continue to display the image data based on the current refresh rate of the display screen. When the electronic device continues to display the image data based on the current refresh rate of the display screen, the electronic device may continue to determine whether the refresh rate of the display screen needs to be switched, that is, the electronic device may continue to perform S1303. When the electronic device determines that the refresh rate of the display screen needs to be switched, the electronic device determines a new refresh rate, so that the refresh rate of the display screen may be switched to the new refresh rate, that is, the electronic device may continue to perform the following S1304.

In some examples, that the electronic device determines whether the refresh rate of the display screen needs to be switched may include: When a display frame rate of the first application running on the electronic device needs to be switched, the electronic device may determine that the refresh rate of the display screen needs to be switched. When the display frame rate of the first application of the electronic device does not need to be switched, the electronic device may determine that the refresh rate of the display screen does not need to be switched.

To be specific, when the first application runs, the first application may switch the display frame rate. When the first application switches the display frame rate, the electronic device may determine that the refresh rate of the display screen needs to be switched, to ensure smoothness of the displayed image data. It should be noted that when the first application switches the display frame rate, for example, when the first application increases the display frame rate, the electronic device may correspondingly switch the refresh rate of the display screen to a high refresh rate. When the first application switches the display frame rate, for example, when the first application reduces the display frame rate, the electronic device may correspondingly switch the refresh rate of the display screen to a low refresh rate.

For example, with reference to FIG. 12, a process in which the electronic device determines whether the refresh rate of the display screen needs to be switched may include: When the first application (for example, the game application or the video application) of the electronic device runs, the first application may switch the display frame rate, for example, increase the display frame rate of the first application. When the display frame rate of the first application is switched, the first application may notify the frame switching service at the application framework layer of the electronic device, for example, the first application sends a display frame rate switching notification to the frame switching service at the application framework layer of the electronic device. When the frame switching service receives the display frame rate switching notification sent by the first application, the frame switching service may determine that the refresh rate of the display screen needs to be switched, that is, the electronic device may determine that the refresh rate of the display screen needs to be switched.

S1304: The electronic device determines a second refresh rate.

When the electronic device determines that the refresh rate of the display screen needs to be switched, that is, when the electronic device determines that the refresh rate of the display screen is to be switched, the electronic device may determine the second refresh rate, that is, the electronic device may determine a new refresh rate, so that the electronic device may switch the refresh rate of the display screen from the current refresh rate (namely, the first refresh rate) of the display screen to the new refresh rate (namely, the second refresh rate).

The second refresh rate is different from the first refresh rate. In this embodiment of this application, a specific value of the second refresh rate is not limited, provided that the first refresh rate is different from the second refresh rate. For example, when the first refresh rate is 60 Hz, the second refresh rate may be 90 Hz or 120 Hz, or when the first refresh rate is 90 Hz, the second refresh rate may be 60 Hz or 120 Hz.

In some examples, that the electronic device determines a second refresh rate may include: The electronic device may determine the second refresh rate based on the display frame rate of the first application of the electronic device. To be specific, when the display frame rate of the first application is switched to a first display frame rate, the electronic device may determine the second refresh rate based on the first display frame rate.

In some examples, the second refresh rate may correspond to the display frame rate of the first application of the electronic device. The electronic device may determine the second refresh rate based on the display frame rate of the first application of the electronic device and a correspondence between a display frame rate of the first application and a refresh rate. For example, when the display frame rate of the first application is 60 Hz, the second refresh rate may be 60 Hz. When the display frame rate of the first application is 90 Hz, the second refresh rate may be 90 Hz. When the display frame rate of the first application is 120 Hz, the second refresh rate may be 120 Hz.

In some other examples, that the electronic device determines a second refresh rate may include: The electronic device may determine the second refresh rate based on the display frame rate of the first application of the electronic device, a scenario of the electronic device, and ambient light in which the electronic device is located. In other words, the second refresh rate may correspond to a display frame rate of a second application of the electronic device, the scenario of the electronic device, and the ambient light in which the electronic device is located.

For example, with reference to FIG. 12, a process of determining the second refresh rate by the electronic device may include: When the frame switching service at the application framework layer of the electronic device receives the display frame rate switching notification sent by the first application of the electronic device, the frame switching service may determine, by using a frame switching policy module at the application framework layer, the new refresh rate, namely, the second refresh rate, to which the refresh rate of the display screen of the electronic device needs to be switched. The frame switching policy module may determine, by using the scenario identification module and the ambient light change module, the new refresh rate to which the refresh rate of the display screen of the electronic device needs to be switched.

S1305: The electronic device determines whether the second refresh rate is higher than the first refresh rate.

After the electronic device determines the second refresh rate (namely, the new refresh rate), the electronic device may determine whether the second refresh rate is higher than the current refresh rate of the display screen, namely, the first refresh rate.

When the electronic device determines that the second refresh rate is lower than the first refresh rate, the electronic device may continue to perform the following S1306-S1311. When the electronic device determines that the second refresh rate is higher than the first refresh rate, the electronic device may continue to perform the following S1312-S1316.

For example, with reference to FIG. 12, a process in which the electronic device determines whether the second refresh rate is higher than the first refresh rate may include: When the frame switching service at the application framework layer of the electronic device receives the display frame rate switching notification sent by the first application of the electronic device, the frame switching service may determine, by using the frame switching policy module at the application framework layer, the new refresh rate, namely, the second refresh rate, to which the refresh rate of the display screen of the electronic device needs to be switched. After the frame switching service determines the second refresh rate, the frame switching service may notify a display synthesis system at the application framework layer of the electronic device. For example, the frame switching service may send a first switching instruction to the display synthesis system, and the first switching instruction includes the second refresh rate.

After the display synthesis system receives the first switching instruction sent by the frame switching service, the display synthesis system may notify the hardware composer at the hardware abstraction layer of the electronic device. For example, the display synthesis system may send the first switching instruction to the hardware composer, and the first switching instruction may include the second refresh rate. When the hardware composer receives the first switching instruction sent by the display synthesis system, the hardware composer may determine whether the second refresh rate is higher than the current refresh rate of the display screen, namely, the first refresh rate.

S1306: The SOC of the electronic device sends the first switching instruction to the display screen IC, where the first switching instruction is used to instruct the display screen IC to switch the refresh rate of the display screen from the first refresh rate to the second refresh rate.

When the electronic device determines that the second refresh rate is lower than the first refresh rate, for example, the first refresh rate may be 90 Hz, and the second refresh rate may be 60 Hz, that is, the refresh rate of the display screen of the electronic device needs to be switched from a high refresh rate to a low refresh rate, the SOC of the electronic device may send the first switching instruction to the display screen IC. The first switching instruction is used to instruct the display screen IC to switch the refresh rate of the display screen from the first refresh rate to the second refresh rate.

For example, with reference to FIG. 12, a process in which the SOC of the electronic device sends the first switching instruction to the display screen IC may include: When the hardware composer at the hardware abstraction layer of the electronic device determines that the second refresh rate is lower than the first refresh rate, the hardware composer may send the first switching instruction to the frame switching driver at the kernel layer of the electronic device by using the delay switching transmission time interface. The first switching instruction is used to instruct the display screen IC to switch the refresh rate of the display screen from the first refresh rate to the second refresh rate. After the frame switching driver receives the first switching instruction, the first switching instruction may send the first switching instruction to the display screen IC of the electronic device by using the transmission channel at the kernel layer of the electronic device, so that the display screen IC of the electronic device can switch the refresh rate of the display screen from the first refresh rate to the second refresh rate based on the first switching instruction. That is, the SOC of the electronic device sends the first switching instruction to the display screen IC of the electronic device.

S1307: The display screen IC of the electronic device switches the refresh rate of the display screen from the first refresh rate to the second refresh rate.

After the display screen IC of the electronic device receives the first switching instruction sent by the SOC of the electronic device, the display screen IC of the electronic device may switch the refresh rate of the display screen from the first refresh rate to the second refresh rate based on the first switching instruction, so that the display screen of the electronic device can display the image data based on the second refresh rate.

S1308: The SOC of the electronic device determines whether switching of the refresh rate of the display screen from the first refresh rate to the second refresh rate is completed.

When the SOC of the electronic device determines that switching of the refresh rate of the display screen from the first refresh rate to the second refresh rate is not completed, the electronic device may continue to perform S1308. When the SOC of the electronic device determines that switching of the refresh rate of the display screen from the first refresh rate to the second refresh rate is completed, the electronic device may continue to perform the following S1309.

In some examples, that the SOC of the electronic device determines whether switching of the refresh rate of the display screen from the first refresh rate to the second refresh rate is completed may include: After the SOC of the electronic device sends a Vsync signal corresponding to the first switching instruction to the display screen IC, when a third Vsync signal arrives, the SOC of the electronic device may determine that switching of the refresh rate of the display screen from the first refresh rate to the second refresh rate is completed. After the SOC of the electronic device sends the Vsync signal corresponding to the first switching instruction to the display screen IC, before the third Vsync signal arrives, the SOC of the electronic device may determine that switching of the refresh rate of the display screen from the first refresh rate to the second refresh rate is not completed. In other words, when a rising edge of the third Vsync signal obtained after the SOC of the electronic device sends the vertical synchronization Vsync signal of the first switching instruction arrives, the SOC of the electronic device may determine that the switching of the refresh rate of the display screen is completed.

For example, with reference to FIG. 12, a process in which the SOC of the electronic device determines whether switching of the refresh rate of the display screen from the first refresh rate to the second refresh rate is completed may include: When the hardware composer at the hardware abstraction layer of the electronic device determines that the second refresh rate is lower than the first refresh rate, the hardware composer may send the first switching instruction to the frame switching driver at the kernel layer of the electronic device by using the delay switching transmission time interface. After the frame switching driver receives the first switching instruction, and after the hardware composer sends the Vsync signal corresponding to the first switching instruction to the display screen IC, when the third Vsync signal arrives, the hardware composer may determine that switching of the refresh rate of the display screen from the first refresh rate to the second refresh rate is completed. Before the third Vsync signal arrives, the hardware composer may determine that switching of the refresh rate of the display screen from the first refresh rate to the second refresh rate is completed.

S1309: The SOC of the electronic device switches transmission duration of the image data from the first transmission duration to second transmission duration.

When the SOC of the electronic device determines that switching of the refresh rate of the display screen from the first refresh rate to the second refresh rate is completed, the SOC of the electronic device may switch the transmission duration of the image data from the first transmission duration to the second transmission duration.

The transmission duration of the image data is duration in which the SOC of the electronic device transmits one frame of image data to the screen of the electronic device. The second transmission duration is transmission duration of image data corresponding to the second refresh rate, namely, duration in which the SOC of the electronic device transmits one frame of image data to the screen of the electronic device when the refresh rate of the display screen of the electronic device is the second refresh rate.

In some examples, the transmission duration of the image data may include duration in which the SOC of the electronic device compresses one frame of image data, and duration in which the SOC of the electronic device sends one frame of image data to the display screen IC. To be specific, the second transmission duration may include duration in which the SOC of the electronic device compresses one frame of image data and duration in which the SOC of the electronic device sends one frame of image data to the display screen IC when the refresh rate of the display screen of the electronic device is the second refresh rate. The first transmission duration may include duration in which the SOC of the electronic device compresses one frame of image data and duration in which the SOC of the electronic device sends one frame of image data to the display screen IC when the refresh rate of the display screen of the electronic device is the first refresh rate.

In some examples, that the SOC of the electronic device switches transmission duration of the image data from the first transmission duration to second transmission duration may include: The SOC of the electronic device switches the duration in which the SOC of the electronic device compresses one frame of image data and that is included in the first transmission duration to the duration in which the SOC of the electronic device compresses one frame of image data and that is included in the second transmission duration, and the SOC of the electronic device switches the duration in which the SOC of the electronic device sends one frame of image data to the display screen IC and that is included in the first transmission duration to the duration in which the SOC of the electronic device sends one frame of image data to the display screen IC and that is included in the second transmission duration.

That the SOC of the electronic device switches the duration in which the SOC of the electronic device sends one frame of image data to the display screen IC and that is included in the first transmission duration to the duration in which the SOC of the electronic device compresses one frame of image data and that is included in the second transmission duration may be that the SOC of the electronic device switches an Mipi-clk corresponding to the first refresh rate being the refresh rate of the display screen of the electronic device to an Mipi-clk corresponding to the second refresh rate being the refresh rate of the display screen of the electronic device.

That the SOC of the electronic device switches the duration in which the SOC of the electronic device sends one frame of image data to the display screen IC and that is included in the first transmission duration to the duration in which the SOC of the electronic device sends one frame of image data to the display screen IC and that is included in the second transmission duration may be that the SOC of the electronic device switches an mdp-clk corresponding to the first refresh rate being the refresh rate of the display screen of the electronic device to an mdp-clk corresponding to the second refresh rate being the refresh rate of the display screen of the electronic device.

For example, with reference to FIG. 12, a process in which the SOC of the electronic device switches the transmission duration of the image data from the first transmission duration to the second transmission duration may include: When the hardware composer at the hardware abstraction layer of the electronic device determines that the second refresh rate is lower than the first refresh rate, the hardware composer may send the first switching instruction to the frame switching driver at the kernel layer of the electronic device by using the delay switching transmission time interface. After the frame switching driver receives the first switching instruction, and after the hardware composer sends the Vsync signal corresponding to the first switching instruction to the display screen IC, when the third Vsync signal arrives, the hardware composer may determine that switching of the refresh rate of the display screen from the first refresh rate to the second refresh rate is completed. After the hardware composer determines that switching of the refresh rate of the display screen from the first refresh rate to the second refresh rate is completed, the hardware composer may send a transmission duration switching instruction to the frame switching driver at the kernel layer of the electronic device by using the delay switching transmission time interface. The transmission duration switching instruction is used to instruct the frame switching driver to switch the transmission duration of the image data from the first transmission duration to the second transmission duration. The transmission duration switching instruction may include an Mipi-clk switching instruction and an mdp-clk switching instruction. The frame switching driver switches the Mipi-clk and the mdp-clk corresponding to the first refresh rate to the Mipi-clk and the mdp-clk corresponding to the second refresh rate based on the Mipi-clk switching instruction and the mdp-clk switching instruction. That is, the SOC of the electronic device switches the transmission duration of the image data from the first transmission duration to the second transmission duration.

The displaySetFps interface is added to the hardware composer (HWC) of the electronic device. When a refresh rate is switched, this interface function may be first invoked to send a switching instruction by using the interface function. Before the hardware composer sends the transmission duration switching instruction to the frame switching driver at the kernel layer of the electronic device by using the delay switching transmission time interface, the hardware composer may first obtain, from the frame switching driver, a quantity of frames that need to be delayed to switch the Mipi-clk and the mdp-clk when switching the refresh rate. After determining the quantity of frames that need to be delayed to switch the Mipi-clk and the mdp-clk, the frame switching driver may notify the hardware composer.

It should be noted that after the SOC of the electronic device sends the Vsync signal corresponding to the switching instruction to the display screen IC, before the third Vsync signal arrives, that is, before the SOC of the electronic device determines that switching of the refresh rate of the display screen from the first refresh rate to the second refresh rate is not completed, duration in which the SOC of the electronic device transmits one frame of image data to the screen of the electronic device is still the first transmission duration, namely, transmission duration corresponding to the first refresh rate.

S1310: The SOC of the electronic device transmits the image data corresponding to the first application to the display screen based on the second transmission duration.

After the SOC of the electronic device switches the transmission duration of the image data from the first transmission duration to the second transmission duration, the SOC of the electronic device may transmit the image data corresponding to the first application to the display screen based on the second transmission duration (namely, transmission duration corresponding to a switched-to refresh rate).

S1311: The display screen of the electronic device displays the image data corresponding to the first application based on the second refresh rate.

After the SOC of the electronic device transmits the image data corresponding to the first application to the display screen based on the second transmission duration, the display screen of the electronic device may display the image data corresponding to the first application based on the second refresh rate.

S1312: The SOC of the electronic device sends a second switching instruction to the display screen IC, disables a low power mode, and switches the transmission duration of the image data from the first transmission duration to the second transmission duration.

When the electronic device determines that the second refresh rate is higher than the first refresh rate, for example, the first refresh rate may be 60 Hz, and the second refresh rate may be 90 Hz, that is, the refresh rate of the display screen of the electronic device needs to be switched from a low refresh rate to a high refresh rate, the SOC of the electronic device may send the second switching instruction to the display screen IC. The second switching instruction is used to instruct the display screen IC to switch the refresh rate of the display screen from the first refresh rate to the second refresh rate.

While the SOC of the electronic device may send the second switching instruction to the display screen IC, the SOC of the electronic device may disable the low power mode (ultra-low power state, ulps). When the SOC of the electronic device is in the low power mode, switching of the transmission duration of the image data cannot be performed. Therefore, before the SOC of the electronic device can switch the transmission duration of the image data from the first transmission duration to the second transmission duration, the SOC of the electronic device may disable the low power mode.

After the SOC of the electronic device disables the low power mode, the SOC of the electronic device may switch the transmission duration of the image data from the first transmission duration to the second transmission duration.

For a process in which the SOC of the electronic device switches the transmission duration of the image data from the first transmission duration to the second transmission duration, refer to a process in which the SOC of the electronic device switches the transmission duration of the image data from the first transmission duration to the second transmission duration in the foregoing S1309. Details are not described herein again in this embodiment of this application.

After the SOC of the electronic device switches the transmission duration of the image data from the first transmission duration to the second transmission duration, the SOC of the electronic device may transmit the image data to the display screen based on the second transmission duration (namely, transmission duration corresponding to a switched-to refresh rate).

For example, with reference to FIG. 12, a process in which the SOC of the electronic device sends the switching instruction to the display screen IC, disables the low power mode, and switches the transmission duration of the image data from the first transmission duration to the second transmission duration may include: When the hardware composer at the hardware abstraction layer of the electronic device determines that the first refresh rate is higher than the second refresh rate, the hardware composer sends the second switching instruction to the frame switching driver at the kernel layer of the electronic device, that is, the SOC of the electronic device sends the second switching instruction to the display screen IC of the electronic device. The second switching instruction is used to instruct the display screen IC to switch the refresh rate of the display screen from the second refresh rate to the first refresh rate. After the frame switching driver receives the second switching instruction, the frame switching driver may send the second switching instruction to the display screen IC of the electronic device by using the transmission channel at the kernel layer of the electronic device, so that the display screen IC of the electronic device can switch the refresh rate of the display screen from the first refresh rate to the second refresh rate based on the second switching instruction.

While the hardware composer sends the second switching instruction to the frame switching driver at the kernel layer of the electronic device, the hardware composer may disable the low power mode, and send a transmission duration switching instruction to the frame switching driver. The transmission duration switching instruction is used to instruct the frame switching driver to switch the transmission duration of the image data from the first transmission duration to the second transmission duration. The transmission duration switching instruction may include an Mipi-clk switching instruction and an mdp-clk switching instruction. The frame switching driver switches an Mipi-clk and an mdp-clk corresponding to the first refresh rate to an Mipi-clk and an mdp-clk corresponding to the second refresh rate based on the Mipi-clk switching instruction and the mdp-clk switching instruction. That is, the SOC of the electronic device switches the transmission duration of the image data from the first transmission duration to the second transmission duration.

S1313: The display screen IC of the electronic device switches the refresh rate of the display screen from the first refresh rate to the second refresh rate.

After the display screen IC of the electronic device receives the switching instruction sent by the SOC of the electronic device, the display screen IC of the electronic device may switch the refresh rate of the display screen from the first refresh rate to the second refresh rate, so that the display screen of the electronic device can display the image data based on the second refresh rate.

S1314: The SOC of the electronic device determines whether switching of the refresh rate of the display screen from the first refresh rate to the second refresh rate is completed.

When the SOC of the electronic device determines that switching of the refresh rate of the display screen from the first refresh rate to the second refresh rate is not completed, the electronic device may continue to perform S1314. When the SOC of the electronic device determines that switching of the refresh rate of the display screen from the first refresh rate to the second refresh rate is completed, the electronic device may continue to perform the following S1315.

In this embodiment of this application, for a specific process in which the SOC of the electronic device determines whether switching of the refresh rate of the display screen from the first refresh rate to the second refresh rate is completed, refer to a specific process in which the SOC of the electronic device determines whether switching of the refresh rate of the display screen from the first refresh rate to the second refresh rate is completed in the foregoing S1307. Details are not described herein again in this embodiment of this application.

S1315: The SOC of the electronic device enables the low power mode, and transmits the image data corresponding to the first application to the display screen based on the second transmission duration.

When the SOC of the electronic device determines that switching of the refresh rate of the display screen from the first refresh rate to the second refresh rate is completed, the SOC of the electronic device may enable the low power mode, and the SOC of the electronic device may transmit the image data corresponding to the first application to the display screen based on the second transmission duration.

S1316: The display screen of the electronic device displays the image data corresponding to the first application based on the second refresh rate.

After the SOC of the electronic device switches the transmission duration of the image data from the first transmission duration to the second transmission duration, the SOC of the electronic device may transmit the image data corresponding to the first application to the display screen based on the second transmission duration (namely, transmission duration corresponding to a switched-to refresh rate), so that the display screen of the electronic device can display the image data corresponding to the first application based on the second refresh rate.

According to the refresh rate switching method provided in this embodiment of this application, when the refresh rate of the display screen of the electronic device is switched from the high refresh rate to the low refresh rate, the software of the electronic device may first deliver the switching instruction to the hardware of the electronic device, and the hardware of the electronic device switches the refresh rate of the display screen from the high refresh rate to the low refresh rate. After the software of the electronic device determines that refresh rate switching is completed, the software of the electronic device switches a time for transmitting the image data from a time corresponding to the high refresh rate to a time corresponding to the low refresh rate. When the software of the electronic device delivers a frame rate switching instruction, the software of the electronic device does not switch a time at which the software of the electronic device transmits the image data to the hardware of the electronic device. This can avoid a problem of trampling TE when the refresh rate of the display screen of the electronic device is switched from the high refresh rate to the low refresh rate, and can avoid a problem such as freezing occurring on a picture displayed on the screen of the electronic device in a process of switching the refresh rate of the display screen of the electronic device.

When the refresh rate of the display screen of the electronic device switches from the low refresh rate to the high refresh rate, the software of the electronic device delivers an instruction for switching a time for transmitting the image data while delivering the switching instruction to the hardware of the electronic device. The hardware of the electronic device switches the refresh rate of the display screen from the high refresh rate to the low refresh rate, and the software of the electronic device switches the time for transmitting the image data from the time corresponding to the low refresh rate to the time corresponding to the high refresh rate. When the software of the electronic device switches the time for transmitting the image data from the time corresponding to the low refresh rate to the time corresponding to the high refresh rate, the software of the electronic device exits the low power mode without re-enabling the low power mode. After the software of the electronic device determines that refresh rate switching is completed, the software of the electronic device enables the low power mode.

When the software of the electronic device switches the time for transmitting the image data from the time corresponding to the low refresh rate to the time corresponding to the high refresh rate, the software of the electronic device exits the low power mode without re-enabling the low power mode. This can shorten duration of switching the time for transmitting the image data. Therefore, it can be avoided that the duration of switching the time for transmitting the image data exceeds duration corresponding to a next frame obtained when the software of the electronic device delivers the switching instruction, which causes a phenomenon such as blurring occurring on the screen of the electronic device because a next frame of image data starts to be transmitted before transmission of one frame of image data is completed.

Corresponding to the method in the foregoing embodiment, an embodiment of this application further provides a refresh rate switching apparatus. The refresh rate switching apparatus may be applied to an electronic device to implement the method in the foregoing embodiment. A function of the refresh rate switching apparatus may be implemented by using hardware, or may be implemented by executing corresponding software by hardware. The hardware or the software includes one or more modules corresponding to the foregoing function.

Figure 14:
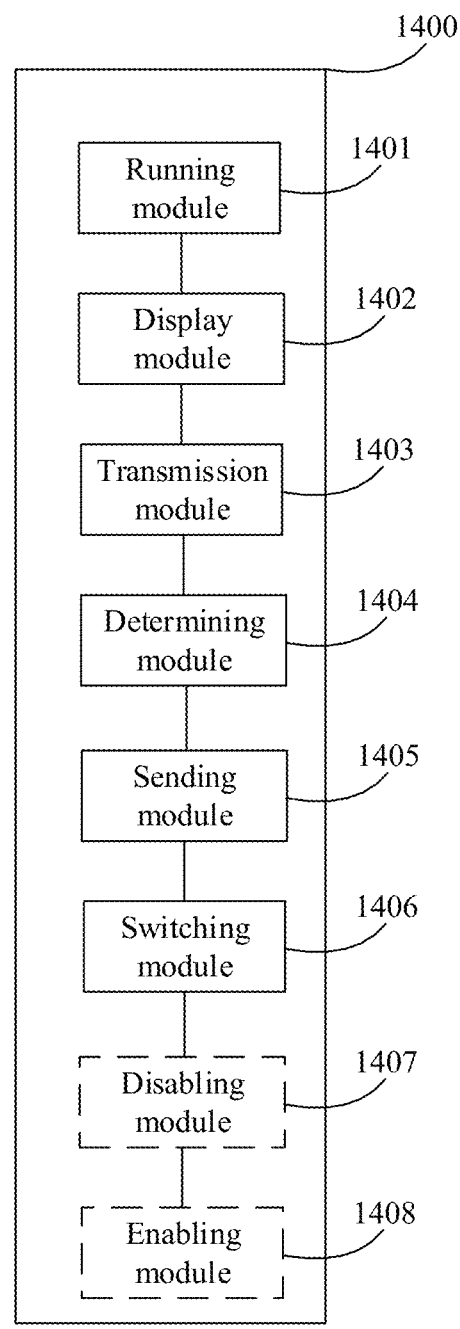
FIG. 14 is a schematic diagram of a structure of a refresh rate switching apparatus according to an embodiment of this application.

For example, FIG. 14 is a schematic diagram of a structure of a refresh rate switching apparatus 1400. As shown in FIG. 14, the refresh rate switching apparatus 1400 may include a running module 1401, a display module 1402, a transmission module 1403, a determining module 1404, a sending module 1405, a switching module 1406, and the like.

The running module 1401 may be configured to run a first application.

The display module 1402 may be configured to display image data corresponding to the first application on a display screen based on a first refresh rate.

The transmission module 1403 may be configured to transmit the image data corresponding to the first application to a display screen IC based on first transmission duration corresponding to the first refresh rate.

The determining module 1404 may be configured to determine a second refresh rate when the electronic device determines that a refresh rate of the display screen is to be switched.

The sending module 1405 may be configured to send a first switching instruction to the display screen IC when the second refresh rate is lower than the first refresh rate.

The switching module 1406 may be configured to switch the refresh rate of the display screen from the first refresh rate to the second refresh rate based on the first switching instruction.

The switching module 1406 may be further configured to: when a SOC of the electronic device determines that the switching of the refresh rate of the display screen is completed, switch transmission duration of the image data corresponding to the first application from the first transmission duration to second transmission duration corresponding to the second refresh rate.

The transmission module 1403 may be further configured to transmit the image data corresponding to the first application to the display screen IC based on the second transmission duration.

The display module 1402 may be configured to display the image data corresponding to the first application on the display screen based on the second refresh rate.

In another possible implementation, the determining module 1404 may be configured to: when a rising edge of a third Vsync signal obtained after the SOC of the electronic device sends a vertical synchronization Vsync signal of the first switching instruction arrives, determine that the switching of the refresh rate of the display screen is completed.

In another possible implementation, the sending module 1405 may be specifically configured to send the first switching instruction to the display screen IC by using a delay switching transmission time interface.

The switching module 1406 may be specifically configured to switch the transmission duration of the image data corresponding to the first application from the first transmission duration to the second transmission duration by using the delay switching transmission time interface.

In another possible implementation, the sending module 1405 may be further configured to send a second switching instruction to the display screen IC of the electronic device when the second refresh rate is higher than the first refresh rate.

The refresh rate switching apparatus 1400 may further include a disabling module 1407. The disabling module 1407 may be configured to disable a low power mode ulps.

The switching module 1406 may be further configured to switch the transmission duration of the image data corresponding to the first application from the first transmission duration to the second transmission duration corresponding to the second refresh rate.

The switching module 1406 may be further configured to switch the refresh rate of the display screen from the first refresh rate to the second refresh rate based on the second switching instruction.

The refresh rate switching apparatus 1400 may further include an enabling module 1408. The enabling module 1408 may be configured to enable the low power mode ulps when the SOC of the electronic device determines that the switching of the refresh rate of the display screen is completed.

The transmission module 1403 may be further configured to transmit the image data corresponding to the first application to the display screen IC based on the second transmission duration.

The display module 1402 may be further configured to display the image data corresponding to the first application on the display screen based on the second refresh rate.

In another possible implementation, the determining module 1404 may be configured to: when a rising edge of a third Vsync signal obtained after the SOC of the electronic device sends a vertical synchronization Vsync signal of the second switching instruction arrives, determine that the switching of the refresh rate of the display screen is completed.

In another possible implementation, the determining module 1404 may be configured to: when a display frame rate of the first application is switched, determine that the refresh rate of the display screen is to be switched.

In another possible implementation, the determining module 1404 may be specifically configured to: when the display frame rate of the first application is switched to a first display frame rate, determine the second refresh rate based on the first display frame rate.

In another possible implementation, the first application may include a game application, a video application, or a navigation application.

It should be understood that division of units or modules (referred to as units in the following) in the apparatus is merely logical function division. In actual implementation, all or some of the units or modules may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units are implemented in a form of hardware.

For example, the units may be separately disposed processing elements, or may be integrated into a chip in the apparatus for implementation. In addition, the units may be stored in a memory in a form of a program, and invoked by a processing element of the apparatus to implement a function of the unit. In addition, all or some of these units may be integrated together, or may be implemented independently. The processing element described herein may also be referred to as a processor, and may be an integrated circuit that has a signal processing capability. In an implementation process, the steps in the foregoing methods or the foregoing units may be implemented by using a hardware integrated logic circuit in a processor element, or may be implemented in a form of software invoked by the processing element.

In one example, the units in the foregoing apparatus may be one or more integrated circuits configured to implement the foregoing methods, for example, one or more ASICs, one or more DSPs, one or more FPGAs, or a combination of at least two of these integrated circuit forms.

For another example, when the units in the apparatus may be implemented in a form of scheduling a program by using the processing element, the processing element may be a general-purpose processor, for example, a CPU or another processor that can invoke the program. For another example, these units may be integrated together and implemented in a form of a system on chip SOC.

In an implementation, the units in the foregoing apparatus that implement corresponding steps in the foregoing methods may be implemented in a form of scheduling a program by using the processing element. For example, the apparatus may include a processing element and a storage element, and the processing element invokes a program stored in the storage element to perform the methods described in the foregoing method embodiments. The storage element may be a storage element that is located on a same chip as the processing element, that is, an on-chip storage element.

In another implementation, the program used to perform the foregoing methods may be on a storage element that is located on a different chip from the processing element, that is, an off-chip storage element. In this case, the processing element invokes or loads the program from the off-chip storage element onto the on-chip storage element, to invoke and perform the methods described in the foregoing method embodiments.

For example, an embodiment of this application may further provide an apparatus such as an electronic device, which may include a processor and a memory configured to store instructions executable by the processor. The processor is configured to enable, when executing the instructions, the electronic device to implement the refresh rate switching method described in the foregoing embodiments. The memory may be located inside the electronic device or may be located outside the electronic device. In addition, there are one or more processors.

In still another implementation, the units in the apparatus that implement the steps in the foregoing methods may be configured as one or more processing elements, and these processing elements may be disposed on the corresponding electronic device described above. The processing elements herein may be integrated circuits, such as one or more ASICs, one or more DSPs, one or more FPGAs, or a combination of these types of integrated circuits. These integrated circuits may be integrated together to form a chip.

For example, an embodiment of this application further provides a chip, and the chip may be applied to the foregoing electronic device. The chip includes one or more interface circuits and one or more processors. The interface circuit and the processor are interconnected by using a line. The processor receives computer instructions from the memory of the electronic device through the interface circuit and executes the computer instructions, to implement the methods described in the foregoing method embodiments.

An embodiment of this application further provides a computer program product, including the computer instructions run by the electronic device.

Through the descriptions of the foregoing implementations, a person skilled in the art may clearly understand that, for the purpose of convenient and brief description, only division of the foregoing functional modules is used as an example for description. In actual application, the functions may be allocated to and completed by different functional modules based on a requirement. In other words, an internal structure of the apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions in the embodiments.

In addition, the functional units in the embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product, for example, a program. The software product is stored in a program product, for example, a computer-readable storage medium, including several instructions for instructing a device (which may be a single-chip microcomputer, a chip, or the like) or a processor (processor) to perform all or some of the steps of the methods described in the embodiments of this application. The storage medium includes any medium that can store program code, for example, a USB flash drive, a removable hard disk, a ROM, a RAM, a magnetic disk, or an optical disc.

For example, an embodiment of this application may further provide a computer-readable storage medium, and the computer-readable storage medium stores computer program instructions. When the computer program instructions are executed by an electronic device, the electronic device is enabled to implement the refresh rate switching method described in the foregoing method embodiment.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

What is claimed is:

1. A refresh rate switching method, applied to an electronic device, wherein the method comprises:
running, by the electronic device, a first application;
displaying, by a display screen integrated circuit IC of the electronic device, image data corresponding to the first application on the display screen based on a first refresh rate, and transmitting, by a system on chip (SOC) of the electronic device, the image data corresponding to the first application to the display screen IC based on first transmission duration corresponding to the first refresh rate;
when the electronic device determines that a refresh rate of the display screen is to be switched, determining, by the electronic device, a second refresh rate;
when the second refresh rate is lower than the first refresh rate, sending, by the SOC of the electronic device, a first switching instruction to the display screen IC;
switching, by the display screen IC, the refresh rate of the display screen from the first refresh rate to the second refresh rate based on the first switching instruction;
when the SOC of the electronic device determines that the switching of the refresh rate of the display screen is completed, switching, by the SOC of the electronic device, transmission duration of the image data corresponding to the first application from the first transmission duration to second transmission duration corresponding to the second refresh rate; and
transmitting, by the SOC of the electronic device, the image data corresponding to the first application to the display screen IC based on the second transmission duration, and displaying, by the display screen IC, the image data corresponding to the first application on the display screen based on the second refresh rate.

2. The method according to claim 1, wherein that the SOC of the electronic device determines that the switching of the refresh rate of the display screen is completed comprises:
when a rising edge of a third Vsync signal obtained after the SOC of the electronic device sends a vertical synchronization Vsync signal of the first switching instruction arrives, determining, by the SOC of the electronic device, that the switching of the refresh rate of the display screen is completed.

3. The method according to claim 1, wherein the sending, by the SOC of the electronic device, a first switching instruction to the display screen IC comprises:
  sending, by the SOC of the electronic device, the first switching instruction to the display screen IC by using a delay switching transmission time interface; and
  the switching, by the SOC of the electronic device, transmission duration of the image data corresponding to the first application from the first transmission duration to second transmission duration corresponding to the second refresh rate comprises:
  switching, by the SOC of the electronic device, the transmission duration of the image data corresponding to the first application from the first transmission duration to the second transmission duration by using the delay switching transmission time interface.

4. The method according to claim 1, wherein the method further comprises:
  when the second refresh rate is higher than the first refresh rate, sending, by the SOC of the electronic device, a second switching instruction to the display screen IC of the electronic device, disabling a low power mode, and switching the transmission duration of the image data corresponding to the first application from the first transmission duration to the second transmission duration corresponding to the second refresh rate;
  switching, by the display screen IC of the electronic device, the refresh rate of the display screen from the first refresh rate to the second refresh rate based on the second switching instruction;
  when the SOC of the electronic device determines that the switching of the refresh rate of the display screen is completed, enabling, by the SOC of the electronic device, the low power mode; and
  transmitting, by the SOC of the electronic device, the image data corresponding to the first application to the display screen IC based on the second transmission duration, and displaying, by the display screen IC, the image data corresponding to the first application on the display screen based on the second refresh rate.

5. The method according to claim 4, wherein that the SOC of the electronic device determines that the switching of the refresh rate of the display screen is completed comprises:
  when a rising edge of a third Vsync signal obtained after the SOC of the electronic device sends a vertical synchronization Vsync signal of the second switching instruction arrives, determining, by the SOC of the electronic device, that the switching of the refresh rate of the display screen is completed.

6. The method according to claim 1, wherein that the electronic device determines that a refresh rate of the display screen is to be switched comprises:
  when a display frame rate of the first application is switched, determining, by the electronic device, that the refresh rate of the display screen is to be switched.

7. The method according to claim 6, wherein the determining, by the electronic device, a second refresh rate comprises:
  when the display frame rate of the first application is switched to a first display frame rate, determining, by the electronic device, the second refresh rate based on the first display frame rate.

8. The method according to claim 1, wherein the first application comprises a game application, a video application, or a navigation application.

9. An electronic device, wherein the electronic device comprises a processor and a memory configured to store instructions executable by the processor; and when the processor is configured to execute the instructions, the electronic device is enabled to implement:
  running, by the electronic device, a first application;
  displaying, by a display screen integrated circuit IC of the electronic device, image data corresponding to the first application on the display screen based on a first refresh rate, and transmitting, by a system on chip SOC of the electronic device, the image data corresponding to the first application to the display screen IC based on first transmission duration corresponding to the first refresh rate;
  when the electronic device determines that a refresh rate of the display screen is to be switched, determining, by the electronic device, a second refresh rate;
  when the second refresh rate is lower than the first refresh rate, sending, by the SOC of the electronic device, a first switching instruction to the display screen IC;
  switching, by the display screen IC, the refresh rate of the display screen from the first refresh rate to the second refresh rate based on the first switching instruction;
  when the SOC of the electronic device determines that the switching of the refresh rate of the display screen is completed, switching, by the SOC of the electronic device, transmission duration of the image data corresponding to the first application from the first transmission duration to second transmission duration corresponding to the second refresh rate; and
  transmitting, by the SOC of the electronic device, the image data corresponding to the first application to the display screen IC based on the second transmission duration, and displaying, by the display screen IC, the image data corresponding to the first application on the display screen based on the second refresh rate.

10. The electronic device according to claim 9, wherein that the SOC of the electronic device determines that the switching of the refresh rate of the display screen is completed comprises:
  when a rising edge of a third Vsync signal obtained after the SOC of the electronic device sends a vertical synchronization Vsync signal of the first switching instruction arrives, determining, by the SOC of the electronic device, that the switching of the refresh rate of the display screen is completed.

11. The electronic device according to claim 9, wherein the sending, by the SOC of the electronic device, a first switching instruction to the display screen IC comprises:
  sending, by the SOC of the electronic device, the first switching instruction to the display screen IC by using a delay switching transmission time interface; and
  the switching, by the SOC of the electronic device, transmission duration of the image data corresponding to the first application from the first transmission duration to second transmission duration corresponding to the second refresh rate comprises:
  switching, by the SOC of the electronic device, the transmission duration of the image data corresponding to the first application from the first transmission duration to the second transmission duration by using the delay switching transmission time interface.

12. The electronic device according to claim 9, wherein the electronic device is further enabled to implement:
  when the second refresh rate is higher than the first refresh rate, sending, by the SOC of the electronic device, a second switching instruction to the display screen IC of the electronic device, disabling a low power mode, and switching the transmission duration of the image data corresponding to the first application from the first transmission duration to the second transmission duration corresponding to the second refresh rate;

switching, by the display screen IC of the electronic device, the refresh rate of the display screen from the first refresh rate to the second refresh rate based on the second switching instruction;

when the SOC of the electronic device determines that the switching of the refresh rate of the display screen is completed, enabling, by the SOC of the electronic device, the low power mode; and transmitting, by the SOC of the electronic device, the image data corresponding to the first application to the display screen IC based on the second transmission duration, and displaying, by the display screen IC, the image data corresponding to the first application on the display screen based on the second refresh rate.

13. The electronic device according to claim 12, wherein that the SOC of the electronic device determines that the switching of the refresh rate of the display screen is completed comprises:

when a rising edge of a third Vsync signal obtained after the SOC of the electronic device sends a vertical synchronization Vsync signal of the second switching instruction arrives, determining, by the SOC of the electronic device, that the switching of the refresh rate of the display screen is completed.

14. The electronic device according to claim 9, wherein that the electronic device determines that a refresh rate of the display screen is to be switched comprises:

when a display frame rate of the first application is switched, determining, by the electronic device, that the refresh rate of the display screen is to be switched.

15. The electronic device according to claim 14, wherein the determining, by the electronic device, a second refresh rate comprises:

when the display frame rate of the first application is switched to a first display frame rate, determining, by the electronic device, the second refresh rate based on the first display frame rate.

16. The electronic device according to claim 9, wherein the first application comprises a game application, a video application, or a navigation application.

17. A computer-readable storage medium, wherein the computer-readable storage medium stores computer program instructions; and when the computer program instructions are executed by an electronic device, the electronic device is enabled to implement:

running, by the electronic device, a first application;

displaying, by a display screen integrated circuit IC of the electronic device, image data corresponding to the first application on the display screen based on a first refresh rate, and transmitting, by a system on chip SOC of the electronic device, the image data corresponding to the first application to the display screen IC based on first transmission duration corresponding to the first refresh rate;

when the electronic device determines that a refresh rate of the display screen is to be switched, determining, by the electronic device, a second refresh rate;

when the second refresh rate is lower than the first refresh rate, sending, by the SOC of the electronic device, a first switching instruction to the display screen IC;

switching, by the display screen IC, the refresh rate of the display screen from the first refresh rate to the second refresh rate based on the first switching instruction;

when the SOC of the electronic device determines that the switching of the refresh rate of the display screen is completed, switching, by the SOC of the electronic device, transmission duration of the image data corresponding to the first application from the first transmission duration to second transmission duration corresponding to the second refresh rate; and transmitting, by the SOC of the electronic device, the image data corresponding to the first application to the display screen IC based on the second transmission duration, and displaying, by the display screen IC, the image data corresponding to the first application on the display screen based on the second refresh rate.

18. The computer-readable storage medium according to claim 17, wherein that the SOC of the electronic device determines that the switching of the refresh rate of the display screen is completed comprises:

when a rising edge of a third Vsync signal obtained after the SOC of the electronic device sends a vertical synchronization Vsync signal of the first switching instruction arrives, determining, by the SOC of the electronic device, that the switching of the refresh rate of the display screen is completed.

19. The computer-readable storage medium according to claim 17, wherein the sending, by the SOC of the electronic device, a first switching instruction to the display screen IC comprises:

sending, by the SOC of the electronic device, the first switching instruction to the display screen IC by using a delay switching transmission time interface; and the switching, by the SOC of the electronic device, transmission duration of the image data corresponding to the first application from the first transmission duration to second transmission duration corresponding to the second refresh rate comprises:

switching, by the SOC of the electronic device, the transmission duration of the image data corresponding to the first application from the first transmission duration to the second transmission duration by using the delay switching transmission time interface.

20. The computer-readable storage medium according to claim 17, wherein the electronic device is further enabled to implement:

when the second refresh rate is higher than the first refresh rate, sending, by the SOC of the electronic device, a second switching instruction to the display screen IC of the electronic device, disabling a low power mode, and switching the transmission duration of the image data corresponding to the first application from the first transmission duration to the second transmission duration corresponding to the second refresh rate;

switching, by the display screen IC of the electronic device, the refresh rate of the display screen from the first refresh rate to the second refresh rate based on the second switching instruction;

when the SOC of the electronic device determines that the switching of the refresh rate of the display screen is completed, enabling, by the SOC of the electronic device, the low power mode; and transmitting, by the SOC of the electronic device, the image data corresponding to the first application to the display screen IC based on the second transmission duration, and displaying, by the display screen IC, the image data corresponding to the first application on the display screen based on the second refresh rate.

\* \* \* \* \*